US008222308B2

(12) United States Patent
Cooper-White et al.

(10) Patent No.: US 8,222,308 B2
(45) Date of Patent: *Jul. 17, 2012

(54) POROUS POLYMER STRUCTURES

(75) Inventors: Justin John Cooper-White, Upper Brookfield (AU); Yang Cao, St. Lucia (AU)

(73) Assignee: The University of Queensland, Queensland (AU)

( * ) Notice: Subject to any disclaimer, the term of this patent is extended or adjusted under 35 U.S.C. 154(b) by 678 days.

This patent is subject to a terminal disclaimer.

(21) Appl. No.: 12/296,178

(22) PCT Filed: Apr. 5, 2007

(86) PCT No.: PCT/AU2007/000465
§ 371 (c)(1),
(2), (4) Date: Oct. 6, 2008

(87) PCT Pub. No.: WO2007/115368
PCT Pub. Date: Oct. 18, 2007

(65) Prior Publication Data
US 2009/0270519 A1    Oct. 29, 2009

(30) Foreign Application Priority Data

Apr. 7, 2006 (AU) ............................... 2006901837
Oct. 5, 2006 (AU) ............................... 2006905512

(51) Int. Cl.
*C08J 9/26* (2006.01)
*B01J 13/00* (2006.01)
(52) U.S. Cl. ............... 521/63; 516/98; 516/99; 521/61; 521/64
(58) Field of Classification Search .................... 521/63, 521/61, 64; 516/98, 99
See application file for complete search history.

(56) References Cited

U.S. PATENT DOCUMENTS

| 3,589,929 A | 6/1971 | Smolders |
| 4,247,498 A | 1/1981 | Castro |
| 4,539,256 A | 9/1985 | Shipman |
| 4,673,695 A | 6/1987 | Aubert et al. |
| 5,099,060 A | 3/1992 | Kohn et al. |
| 5,198,507 A | 3/1993 | Kohn et al. |
| 5,216,115 A | 6/1993 | Kohn et al. |
| 5,219,564 A | 6/1993 | Zalpsky et al. |
| 5,395,570 A | 3/1995 | Kopp et al. |
| 5,587,507 A | 12/1996 | Kohn et al. |

(Continued)

FOREIGN PATENT DOCUMENTS

WO    98/36013 A1    8/1998

(Continued)

OTHER PUBLICATIONS

Copending U.S. Appl. No. 12/296,177.

(Continued)

*Primary Examiner* — Timothy J. Kugel
(74) *Attorney, Agent, or Firm* — Dobrusin & Thennisch PC

(57) ABSTRACT

A method of preparing a porous polymer structure comprising the steps of: forming a liquid composition comprising at least one polymer dissolved in at least one solvent; subjecting the liquid composition to stress, and if necessary also to a reduction in temperature, to cause the liquid composition to form a bi-continuous phase separated composition, the bi-continuous phase separated composition comprising a polymer rich phase and a polymer poor phase; solidifying the at least one polymer in the polymer rich phase; and removing the polymer poor phase from the polymer rich phase to provide the porous polymer structure having a bi-continuous morphology from the polymer rich phase.

38 Claims, 25 Drawing Sheets

U.S. PATENT DOCUMENTS

| | | | |
|---|---|---|---|
| 5,658,995 | A | 8/1997 | Kohn et al. |
| 5,660,822 | A | 8/1997 | Poiani et al. |
| 5,670,602 | A | 9/1997 | Kohn et al. |
| 5,686,091 | A | 11/1997 | Leong et al. |
| 5,847,012 | A | 12/1998 | Shalaby et al. |
| 6,120,491 | A | 9/2000 | Kohn et al. |
| 6,306,424 | B1 | 10/2001 | Vyakarnam et al. |
| 6,331,586 | B1 | 12/2001 | Thielen et al. |
| 2005/0042253 | A1 | 2/2005 | Farrar et al. |
| 2006/0052040 | A1 | 3/2006 | Prasad |

FOREIGN PATENT DOCUMENTS

| | | |
|---|---|---|
| WO | 99/24391 A1 | 5/1999 |
| WO | 99/24490 A1 | 5/1999 |
| WO | 01/36522 A1 | 5/2001 |

OTHER PUBLICATIONS

International Search Report, Application No. PCT/AU2007/000465, Dated May 24, 2007.
Written Opinion of the International Searching Authority, Application No. PCT/AU2007/000465, dated May 11, 2007.
International Preliminary Report on Patentability, Application No. PCT/AU2007/000465, dated Oct. 8, 2008.
Reed et al., Trans. AM. Soc. Artif. Intern. Organs, p. 109 (1977).
Application No. PCT/US98/23737, filed Nov. 6, 1999, published as WO99/24490.
Application No. PCT/us98/036013.
Application No. PCT/US98/23777, filed Nov. 6, 1998, published as WO99/24391.
U.S. Appl. No. 09/56,050, filed Apr. 7, 1998; Patent No. 6,120,491.
Flory P.J., Principles of polymer chemistry, Ithaca: Cornell University press, 1953.
Olabisi O., Polymer-polymer miscibility, New York: Acadamic Press 1979.
Lloyd D.R. et al., Journal of Membrane Science 1991; 64(1-2):1-11.
Kim S.S. et al., Polymer 1992; 33(5):1047-57.
Flory P.J., "Discussions of the Faraday Society," 1970; No. 49(7-29).
Remington's Pharmaceutical Science, Mac Publishing Co., (A.R. Gennaro edt. 1985).
McGuire K.S., et al, Polymer 1994;35(20);4404-7.
Flory P.J. et al., American Chemical Society 1964; 86(17):3507-14.
Nathan et al., Bio. Cong. Chem., 4, 54-62 (1992).
Nathan, Macromolecules, 25 4476 (1992).
Hua FJ, Park TG, Lee DS; Elsevier Science Ltd. Jan. 9, 2003; A facile preparation of hightly interconnected macroporous poly scaffolds by liquid-liquid phase separation of a PLGA-dioxane-water ternary system. (D5).
Ch. Schugens, V. Maquet, Ch. Grandfils, R. Jerome, and Ph. Teyssie; Journal of Biomedical Materials Research, vol. 30, 449-461 (1996); Polylactide macroporous biodegradable implants for cell transplantation.II. Preparation of polylactide foams by liquid-liquid phase separation.(D1).
Ruiyun Zhang, Peter X. Ma; Department of Biologic Materials Sciences, The University of Michigan, Ann Arbor, Michigan 48109-1078; Macromolecular Science and Engineering Center, The University of Michigan, Ann Arbor, Michigan, 48109-1078; Department of Biomedical Engineering, The University of Michigan, Ann Arbor, Michigan 48109-1078; Sep. 16, 1998; Poly/hydroxyapatite porous composites for bone-tissue engineering. I. Preparation and morphology. (D2).
Shin KC, Kim BS, Kim JH, Park TG, Nam JD, Lee DS; Department of Polymer Science and Engineering, Sungkyunkwan University, Suwon, Kyungki 440-746, South Korea; Department of Biological Sciences, Korea Advanced Institute of Science and Technology, Taejon 305-701, South Korea; Feb. 22, 2005; A facile preparation of highly interconnected macroporous PLGA scaffolds by liquid-liquid phase separation II (D4).
International Search Report, Serial No. PCT/AU2007/000464, dated Aug. 8, 2007.
Written Opinion of the International Searching Authority, Application No. PCT/AU2007/000464, dated Aug. 8, 2007.
International Preliminary Report on Patentability, Application No. PCT/AU2007/000464, dated Oct. 8, 2008.
Extended European Search Report, Dated Aug. 6, 2010, Application No. 07718712.8.
Matsuyama H; Okafuji H; Maki T; Teramoto M; Tsujioka N: "embrane formation via thermally induced phase separation in polypropylene/polybutene/diluent system" *Journal of Applied Polymer Science*, vol. 84, Mar. 6, 2002, pp. 1701-1708. XP-002597579.
Hua F J; Kim G E; Lee J D; Son Y K; Lee D S; "Macroporous poly (L-lactide) scaffold I. Preparation of a macroporous scaffold by liquid-liquid phase separation of a PLLA-dioxane-water system" Journal of Biomedical Materials Research, vol. 63, No. 2, Jan. 1, 2002, pp. 161-167.XP-002597580.
Yoon Sung Nam et al: "Porous biodegradable polymeric scaffolds prepared by thermally induced pahse separation" Journal of Biomedical Materials Research, Wiley, New York, NY, US LNKD-DOI: 10.1002/(SICI) 1097-4636 (199910) 47:1 8::AID-JBM2 3.0. CO; 2-1, vol. 47, No. 1, Jan. 1, 1999, pp. 8-17, XP008008161 ISSN 0221-9304.
Extended European Search Report, Dated Sep. 9, 2010, Application No. 07718711.0.

POROUS POLYMER STRUCTURES

CLAIM OF BENEFIT OF FILING DATE

The present application claims the benefit of the filing date of PCT Application Serial No. PCT/AU2007/000465 (filed 5 Apr. 2007) (Published as WO 2007/115368); AU 2006901837 (filed 7 Apr. 2006); and AU 2006905512 (filed 5 Oct. 2006) the contents of which are hereby incorporated by reference in their entirety.

FIELD OF THE INVENTION

The present invention relates to porous polymer structures and to a method of preparing the same. The porous polymer structures are particularly suitable for use in tissue engineering, and it will therefore be convenient to describe the invention with an emphasis toward this application. However, it is to be understood that the porous polymer structures may be used in various other applications.

BACKGROUND OF THE INVENTION

As a result of their high surface area, large pore volume and/or pore size selectivity, porous polymer materials have found wide application in many technological fields. For example, porous polymers may be used as separation or filtration materials, as absorbent materials and as scaffolds for catalysis, immobilisation of pharmaceutical compounds or biological molecules and tissue engineering.

The pore morphology of a porous polymer will often be a critical parameter in determining its suitability for use in a given application. For separation and filtration technologies, pore size is fundamental to achieving the desired degree of filtration or separation. However, in the case of tissue engineering applications, polymers having pores of an appropriate size alone are generally not sufficient for tissue regeneration. In particular, it has been demonstrated that controlling internal pore architecture such as connectivity and orientation is crucial to controlling the vascularisation and mechanical properties of regenerate tissue. In some applications, it is also important that the porous polymer replicate a complex shape. Accordingly, the ability to control the porous polymer architecture through design and fabrication is often very important to the successful application of these materials.

Numerous techniques for preparing porous polymers which afford varying degrees of control over design and fabrication have been developed. Techniques known in the art include textile processing through crimping, cutting and needling, fibre bonding, electrospinning, solvent casting/particulate leaching (SCPL), thermally induced phase separation (TIPS), gas or blowing agent foaming and rapid prototyping (RP). Of these techniques, textile processing, fibre bonding and electrospinning can produce highly porous and interconnected fibre structures. However, these structures typically have poor mechanical strength.

SCPL techniques have been used to produce porous three dimensional foam structures, and offer relatively good control over pore size and porosity. However, structures produced by this technique are generally limited to membranes having a thickness of no greater than 3 mm, and the pores are generally of an irregular shape and are poorly interconnected.

Gas and blowing agent foaming techniques are technically simple and can be used with a diverse array of polymers, but the resulting porous foam will generally have a closed pore structure and hence poor interconnectivity. On the other hand, RP techniques can produce highly porous and fully interconnected polymer structures, and offer an accurate degree of control over pore size and pore shape. However, the range of polymers suitable for use in RP techniques is limited, and the equipment required to perform the technique is very expensive.

TIPS has been shown to be a particularly effective technique for producing porous polymer structures. This technique has traditionally made use of thermal energy as a driving force to induce phase separation. In performing the technique, a polymer is typically dissolved in a solvent or solvent/non-solvent mixture, and solid-liquid or liquid-liquid phase separation is then induced by lowering the solution temperature. The phase separation results in polymer-rich and polymer-poor phases being formed within the solution. After solidifying one or both of the polymer-rich or polymer-poor phases, the polymer-poor phase is removed leaving a highly porous polymer structure.

TIPS has a number of advantages over other techniques for preparing porous polymer structures. The technique is relatively simple to apply and can be performed at relatively low cost. The morphology of the porous polymer structures can be tailored to some extent through variation of processing parameters such as polymer concentration, solvent/non-solvent type, solvent/non-solvent ratios and thermal quenching strategies such as quenching temperature and quenching rate. The technique is also suitable for use with a diverse array of polymers and demonstrates the capability to produce porous polymers with complex shapes, large size and thick structures.

A notable advantage of TIPS is that it can be used to prepare porous polymers with good interconnectivity of the pores. An interconnected pore morphology is desirable in many applications, for example in tissue engineering applications. In particular, desirable characteristics of polymer structures used in tissue engineering include a highly open porous and interconnected architecture with controlled pore size, porosity, pore shape, and alignment to facilitate oxygen, nutrient, and waste transfer as well as rapid, controlled vascularisation and tissue ingrowth.

In conducting TIPS, cooling parameters for the polymer solution play an important role in determining the morphology of the resultant porous polymer structure. During cooling of a polymer solution, solid-liquid phase separation can occur as a result of solvent freezing or polymer precipitation. A non-solvent may be included in the polymer solution to promote liquid-liquid phase separation. FIG. 1 represents a typical polymer solution phase diagram for a polymer-solvent/non-solvent system at a nominal polymer concentration. The Y-axis defines temperature, with T2 representing the glass transition temperature of the polymer and T3 the solidification temperature of the solvent. These temperatures correspond to solid-liquid phase separation. The X-axis defines the solvent/non-solvent composition, with S1 representing the solvent and S2 representing the non-solvent.

The upper and lower parabolic-like curves in FIG. 1 are known as the binodal and spinodal curves, respectively. In regions defined above the binodal curve, the polymer solution exists as a stable single-phase system, whereas in regions below the binodal curve the polymer solution exists as a metastable or unstable two-phase system. In particular, the spinodal curve demarcates the two-phase region into metastable and unstable regions, with the metastable region being defined between the binodal and spinodal curves, and the unstable region being defined below the spinodal curve. The point Uc on the curves represents the maximum temperature at which spinodal decomposition may occur.

When the temperature of a polymer solution is reduced such that it passes from the single-phase region into the two-phase region, the solution may undergo phase separation by a nucleation and growth mechanism in the metastable region, or a spinodal decomposition mechanism in the unstable region. FIG. 1 illustrates the morphology of the two-phase separated systems that form through each phase separation mechanism. In particular, the nucleation and growth mechanism, which occurs in the metastable region, provides for spheroidal domains, whereas the spinodal decomposition mechanism, which occurs in the unstable region, provides for bi-continuous domains that give rise to interconnected pores.

The final morphology of a porous polymer structure formed by TIPS can be "fixed" by quenching the two-phase structure-formed composition to a temperature either below the glass transition temperature of the polymer (T2 in FIG. 1) and/or below the freezing temperature of the solvent (T3 in FIG. 1). Solvent/non-solvent can then subsequently be removed from the "fixed" porous polymer structure by sublimation, evaporation or solvent extraction under appropriate conditions.

Although it is possible to promote spinodal decomposition using TIPS to form porous polymer structures having an interconnected pore morphology, there are some limitations and disadvantages associated with doing so.

Referring again to FIG. 1, $\phi_2$ defines the solubility limit of a polymer at a specific solvent composition, whereby the polymer is substantially insoluble in solvent compositions to the left of the limit, but soluble enough to form a solution in solvent compositions to the right of the limit. Accordingly, when employing TIPS the viable operating region may be restricted to those solvent compositions which fall to the right of a solubility limit.

FIG. 1 also depicts a typical quenching regime which involves quenching the composition of the polymer solution defined at point X to point Y. Such a quenching regime will afford a porous polymer structure having a morphology which is at least in part derived through a spinodal decomposition mechanism. By this route, the polymer solution will generally first be heated to temperature T1 to provide for a single-phase polymer solution. The solution is then cooled to temperature T4, and in doing so passes through the metastable region (defined between the binodal and spinodal curves) and into the unstable region (defined below the spinodal curve). Under this regime, the cooling rate will be the dominant factor in determining the operative phase separation mechanism, and hence also the resulting morphology of the porous polymer structure. If the cooling rate is sufficiently fast, the polymer solution can quickly pass through the metastable region and into the unstable region, where phase separation will be dominated by a spinodal decomposition mechanism. In contrast, if the cooling rate is relatively slow, the solution may have enough time to form nuclei in the metastable region and phase separation may be dominated by a nucleation and growth mechanism. Accordingly, the temperature range defined by $\Delta T_1$ can also influence the operative phase separation mechanism. That is, where $\Delta T_1$ is large in passing from point X to point Y, the likelihood of at least some phase separation occurring by a nucleation and growth mechanism increases.

An important feature to note from FIG. 1 is that within the viable operating window defined to the right of the solubility limit $\phi_2$, much of the metastable region and all of the unstable region is located at temperatures below the glass transition temperature of the polymer and the freezing temperature of the solvent (i.e. T2 and T3). This is a common feature of phase diagrams for many polymer-solvent/non-solvent systems. In preparing porous polymer structures having an interconnected pore morphology, such a feature presents a number of disadvantages and limitations. One disadvantage is that in order to promote spinodal decomposition, the polymer solution will need to be rapidly quenched to very low temperatures, typically below −100° C. using liquid nitrogen. This adds complexity to performing TIPS, particularly on a large scale, and also adds considerable expense to the process.

Furthermore, a consequence of spinodal decomposition occurring at temperatures below the glass transition temperature of the polymer and/or the freezing point of the solvent is that to promote bi-continuous phase separation the polymer solution must be rapidly quenched into the unstable region so that it becomes supercooled. However, it will be appreciated that in such a supercooled state, the composition is thermodynamically unstable and will rapidly solidify. Accordingly, the ability to vary the morphology of the bi-continuous phase separated composition, and hence the morphology of the resulting porous polymer structure, through aging or annealing is minimal at best. Porous polymer structures having a bi-continuous morphology formed by TIPS are therefore prone to having small pore sizes.

It would therefore be desirable to develop a method that could be used to produce porous polymer structures having interconnected pore morphology which is less reliant upon the need to quench polymer solutions to very low temperatures, and which provides a greater opportunity to tailor the pore morphology of the porous polymer structures.

SUMMARY OF THE INVENTION

According to one aspect of the invention, there is provided the method of preparing a porous polymer, the method comprising:
  forming a liquid composition comprising at least one polymer dissolved in at least one solvent;
  subjecting the liquid composition to stress, to cause the liquid composition to form a bi-continuous phase separated composition, the bi-continuous phase separated composition comprising a polymer rich phase and a polymer poor phase;
  solidifying the at least one polymer in the polymer rich phase; and
  removing the polymer poor phase from the polymer rich phase to provide the porous polymer structure having a bi-continuous morphology from the polymer rich phase.

In one form of the invention the step of subjecting the liquid composition to stress also includes a reduction in temperature.

The invention also provides a porous polymer prepared in accordance with the method defined in the immediately preceding paragraph. Porous polymers prepared in accordance with this method advantageously exhibit a bi-continuous morphology which is made up of a collection or plurality of interconnected pores having a cellular structure.

This unique bi-continuous morphology may be present in a region(s) of or entirely throughout the polymer structure. The porous polymers of the invention exhibit advantageous properties in, for example, tissue engineering applications as their cellular pore structure enables better control over cell and tissue development and diffusion of nutrients to the developing cells and tissues.

Accordingly, the invention further provides a porous polymer structure, at least a portion of which has a bi-continuous morphology made up of pores having a cellular structure.

As used herein, the expression "pores having a cellular structure" is intended to define the unique bi-continuous morphology of the porous polymers formed in accordance with the invention. The pores may also be described as having an ordered, non-random, substantially uniform, and/or substantially isotropic structure. What is intended by this terminology can also be further qualified with reference to FIG. 12 or 13 and 14, details of which are discussed below.

As used herein, the term "bi-continuous" is intended to be a reference to a morphology having two continuous interwoven interfaces. Thus, in the context of the invention the "bi-continuous phase separated composition" denotes two continuous interwoven phases made up from the polymer rich and the polymer poor phases. Similarly, a porous polymer having a "bi-continuous morphology" will be one having a continuous polymer matrix interwoven with continuous voids or pores that afford an interconnected pore network.

The mechanism by which the bi-continuous phase separated composition forms during the method of the invention is not yet fully understood. However, without wishing to be limited by theory it is believed that by subjecting the liquid composition to stress, and if necessary also to a reduction in temperature, the composition may form a bi-continuous liquid-liquid phase separated composition, which itself might then form a bi-continuous liquid-solid phase separated composition. Alternatively, solvent/non-solvent in the liquid composition may begin to nucleate and solidify to form a continuous solid phase network, which in turn results in the formation of a bi-continuous liquid-solid phase separated composition. As part of the phase separation mechanism(s), one of the bi-continuous phases will typically be formed polymer rich and the other phase polymer poor. Where a solid continuous phase is formed, it is believed that the remaining liquid continuous phase will generally be the polymer rich phase.

Those skilled in the art will appreciate the meaning of the expressions "polymer rich" and "polymer poor" in the context of phase separated compositions. In general terms, as part of the phase separation process, dissolved polymer will typically preferentially separate with the phase in which it is more soluble resulting in a polymer rich phase and a polymer poor phase. Provided that the porous polymer can be formed, there is no particular limitation on the percentage of polymer that needs to be present in the polymer rich phase, relative to that present in the polymer poor phase. However, as a convenient point of reference only, such a polymer rich phase is likely to comprise greater than 50 wt %, preferably greater than 60 wt %, more preferably greater than 80 wt %, of the total amount of dissolved polymer in the liquid composition.

A detailed mechanistic understanding of how the bi-continuous phase separated composition forms is not believed to be particularly important in terms of performing the invention. Nevertheless, to assist with describing the invention further, and given that the bi-continuous phase separated composition is believed to form in the unstable region of the liquid compositions associated phase diagram, the bi-continuous phase separated composition will simply be referred to herein as being formed through a spinodal decomposition mechanism. As mentioned above, the liquid composition may also move through a liquid-liquid or liquid-solid phase transition to a spinodal decomposition mechanism.

It has now been found that the application of stress to a liquid composition which comprises at least one polymer dissolved in at least one solvent can cause an advantageous shift of the binodal and spinodal curves in the liquid compositions associated phase diagram.

With reference to FIG. 2, it is believed that the application of stress may have the effect of altering the thermodynamic behaviour of the phase separation such that the phase separation boundaries are dictated by curve B rather than by original curve A (i.e. no applied stress). As a result of this shift in the phase separation boundaries, the composition of the polymer solution defined at point X now needs only to be cooled to point Z in order to enter into the unstable region where phase separation is dominated by a spinodal decomposition mechanism. Point Z, which is positioned at temperature T4', not only resides well above point Y, which is positioned at temperature T4 (shown in FIG. 1), but also resides above the glass transition temperature (T2) of the polymer and the freezing point of the solvent (T3). Accordingly, significantly less energy needs to be expended to promote the transition from point X to point Z compared with that required to promote the transition from point X to point Y (shown in FIG. 1).

Furthermore, given that point Z is located above T2 and T3, the polymer solution is not in a supercooled state and is therefore more thermodynamically stable than if it were cooled to point Y (shown in FIG. 1). Under these conditions the bi-continuous morphology can advantageously be readily annealed or aged to modify the morphology of the resultant porous polymer structure. In particular, the pore shape and size can be readily tailored. Having attained the desired bi-continuous structure-formed composition, the temperature of the composition can then be reduced to either below the glass transition temperature of the polymer and/or the freezing point of the solvent to "fix" the final architecture of the porous polymer matrix (i.e. solidify the at least one polymer). Alternatively, it may be possible to apply pressure to the composition to cause pressure-induced crystallisation of the solvent, which may in turn provide for the same "fixing" effect. Solvent/non-solvent can then be removed, for example by evaporation, sublimation or solvent extraction under appropriate conditions to form the porous polymer.

As illustrated in FIG. 2, the application of stress to the polymer solution can also cause the gradient of the binodal and spinodal curves to change. An advantageous effect of this is that the transition temperature range ($\Delta T$) in passing through the metastable region into the unstable region can be reduced. Thus, in FIG. 2 $\Delta T_1$ from curve A (representing a non-stressed solution) is greater than $\Delta T_2$ from curve B (representing a stressed solution). In practical terms, a reduction in the temperature range $\Delta T$ enables the morphology of the porous polymer structure to be more precisely controlled. In particular, where it is desirable to maximise phase separation by a spinodal decomposition mechanism, a low $\Delta T$ minimises the chances of phase separation occurring by a nucleation and growth mechanism in a given quenching regime. Furthermore, such phase separation control can be realised with less reliance on applying rapid quenching regimes.

The invention therefore provides a particularly effective and efficient method of preparing porous polymer structures having a bi-continuous morphology. A particular advantage afforded by the invention is that it can provide a greater window of opportunity for annealing or aging the bi-continuous structure-formed composition, and hence provide more scope to tailor the porous polymer morphology. Furthermore, through the application of stress during the formation of the porous polymers it has been found the collection of pores that make up the bi-continuous morphology can be formed with a cellular structure.

According to a second aspect of the invention there is provided a method of preparing a porous polymer structure comprising the steps of:

forming a liquid composition comprising at least one polymer dissolved in at least one solvent;

subjecting the liquid composition to stress to decrease the Gibbs free energy of mixing of the composition and form a substantially homogeneous solution;

simultaneously or consecutively decreasing the temperature of the liquid composition to form a bi-continuous phase separated composition, the bi-continuous phase separated composition comprising a polymer rich phase and a polymer poor phase;

solidifying the at least one polymer in the polymer rich phase; and removing the polymer poor phase from the polymer rich phase to provide the porous polymer structure having a bi-continuous morphology from the polymer rich phase.

According to a third aspect of the invention, there is provided a method of preparing a porous polymer structure comprising the steps of:

forming a liquid composition comprising at least one polymer dissolved in at least one solvent, the liquid composition being a substantially homogeneous solution at a predetermined temperature;

subjecting the liquid composition to stress at the predetermined temperature to increase the Gibbs-free energy of mixing of the composition causing the liquid composition to form a bi-continuous phase separated composition at the predetermined temperature, the bi-continuous phase separated composition comprising a polymer rich phase and a polymer poor phase;

solidifying the at least one polymer in the polymer rich phase; and removing the polymer poor phase from the polymer rich phase to provide the porous polymer structure having a bi-continuous morphology from the polymer rich phase.

BRIEF DESCRIPTION OF THE DRAWINGS

The invention will also be described herein with reference to the following non-limiting drawings in which.

DETAILED DESCRIPTION OF THE EMBODIMENTS

Figure 1:
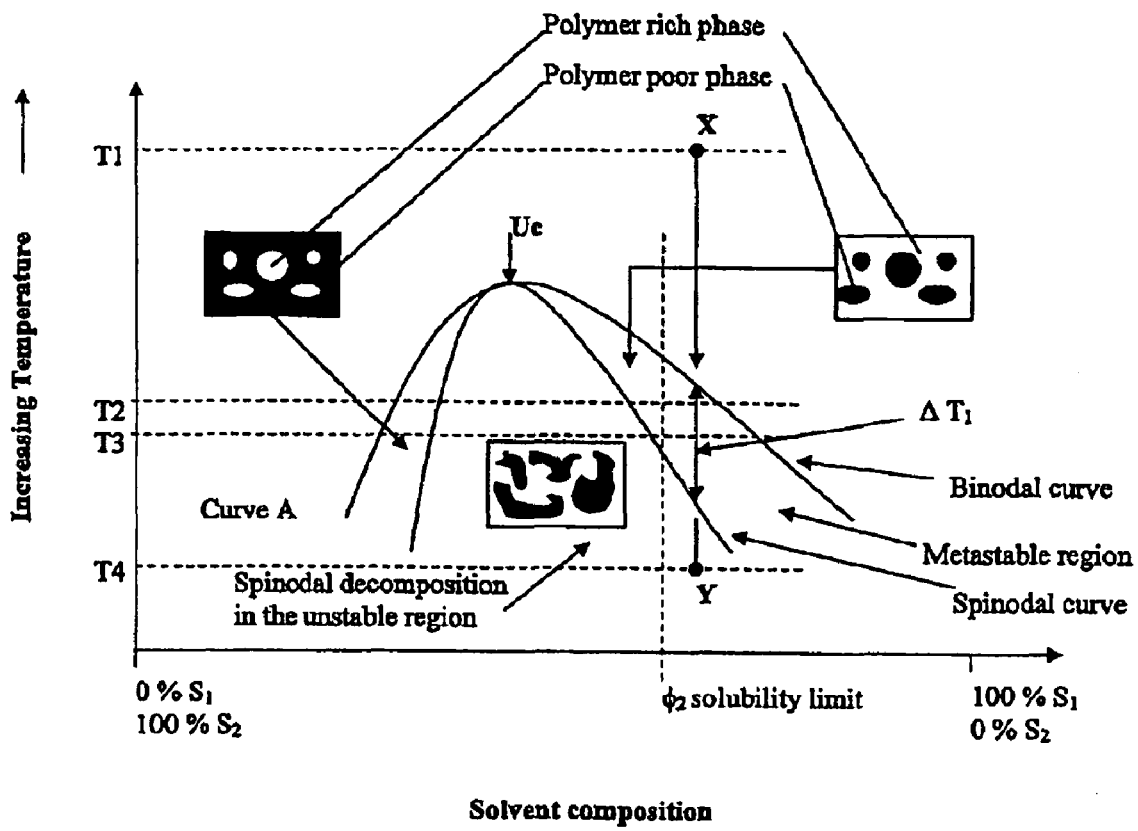
FIG. 1 depicts a typical polymer solution phase diagram for a polymer-solvent/non-solvent system at a nominal polymer concentration.

As used herein, the term "stress" denotes an applied force that promotes bi-continuous phase separation of the liquid composition. Provided that the stress promotes phase separation of the liquid it may be conveniently applied through different means. For example, stress may be applied through isotropic compression or tension (i.e. pressure) and/or flow. It will be appreciated by the person skilled in the art that an imposed flow of the liquid composition will create one or more types of stresses within the composition. The stresses may include those created by placing the polymer solution under pressure or releasing pressure at the appropriate stage of fixing the polymer solution.

As used herein the term "isotropic compressive stress" or the term "isotropic compression" is intended to mean a stress applied to the liquid composition which results in its compaction or a decrease in its volume. It may be imparted to the liquid composition by applying an equal inwardly directed force normal to all surfaces of the liquid composition. For example, an isotropic compressive stress may be applied to the composition by placing it under pressure (atmospheric or higher) through the introduction of an immiscible gas or liquid which is itself under pressure (atmospheric or higher). The composition may also be put under pressures higher than atmospheric by applying a force normal to its surfaces via the wall(s) of the holding container or retainers by moving one or more of the walls inwardly within a cavity holding the composition. Isotropic compressive stress, when imposed by an increase in pressure, may cause the pores of the polymer structure so created to be substantially similar in dimension within regions of equivalent or similar pressure.

As used herein, the term "isotropic tensile stress" or the term "isotropic tension" is intended to mean a stress applied to the liquid composition which results in or leads to an expansion in its volume. It may be imparted to the composition by applying an equal outwardly directed force normal to its surfaces. For example, an isotropic tensile stress may be applied to the liquid composition by placing it under negative pressure (vacuum). The liquid composition may also be put under pressures lower than atmospheric by applying a force normal to its surfaces via the wall(s) of the holding container or retainers by moving one or more of the walls outwardly within a cavity holding the composition. Isotropic tensile stress, when imposed by a change in pressure, may also cause the pores of the polymer structure so created to be substantially similar in dimension within regions of equivalent or similar pressure.

As used herein the term "flow stress" or the term "flow" is intended to mean an applied stress that encourages or causes deformation of the liquid composition and may be imparted by encouraging the polymer to undergo some form of directional flow. Flow stress includes shear and normal stresses. Shear and normal stresses can act on the composition simultaneous or alone. Shear stress is defined to act tangent or shear to the surface being deformed, whilst normal stress is defined to act normal (tensile) to the surface being deformed by the flow. These definitions are explicit when we consider a fluid as being composed of a series of layers or surfaces, and whether the stress is shear or normal depends as to whether it acts tangent to each layer or surface, or normal to each surface throughout the fluid.

"Extensional stresses" within liquids are a subset of normal stresses by definition, which result in or lead to the liquid being 'stretched' in one, two or three dimensions (uniaxial, biaxial, equiaxial tension). Shear and extensional stresses, for example, may be imparted on the liquid composition by mixing or extruding it. The application of flow stress encourages the alignment of the pores within the porous polymer structure and/or encourages the formation of regions having substantially similar pore dimensions within regions of equivalent or similar levels of flow stress. The application of shear stress, for example through rotational flow or mixing, encourages the alignment of pores in a radial direction in the outer regions of the porous polymer structure so created. Extensional stresses may be imparted by releasing the boundaries or walls of the composition holding container or mould or stretching the liquid composition prior to, during or post phase separation. It is believed that the imposition of normal (tensile) stress to the composition may encourage the formation of pores aligned in a desired direction.

For avoidance of any doubt, unless otherwise stated the term "porous polymer" used herein is intended to refer to polymer having a collection of voids or pores. The polymer material per se which forms the porous polymer may itself also be permeable, for example to liquids and/or gases.

The liquid composition used in accordance with the invention comprises at least one polymer dissolved in at least one solvent. In this context, the term "solvent" is intended to mean a material, or combination of materials, which is capable of dissolving one or more selected polymers. Those skilled in the art will appreciate that at a fixed volume and temperature certain solvents will be capable of dissolving more polymer than others. From a practical point of view, a "solvent" suitable for use in accordance with the invention will be one or materials that are capable of dissolving sufficient polymer to enable the porous polymer to be formed. Conversely, a "non-solvent" will be one or more materials that are not capable of dissolving sufficient polymer to enable the porous polymer to be formed.

As a convenient point of reference only, in the context of the present invention a person skilled in the art might consider a material(s) a "solvent" if at the required temperature it is capable of dissolving at least 0.5% (w/v) in total of the one or more selected polymers. Conversely, a material(s) might be considered a "non-solvent" if at the required temperature it is not capable of dissolving at least 0.5% (w/v) in total of the one or more selected polymers. Preferably, a "solvent" will be capable of dissolving at least 1, more preferably at least 2, most preferably at least 5% (w/v) in total of the one or more selected polymers.

The liquid composition may also comprise other components such as one or more other polymers, one or more other solvents, one or more non-solvents, solid and/or semi-solid particulate materials, and additives, provided that such components do not adversely effect the ability to prepare the porous polymer structure. The function and nature of these further components will be discussed in more detail below.

The method of the invention can advantageously be performed with a diverse array of polymers. To form the porous polymer structures, the polymers need only to be capable of being dissolved in the at least one solvent. Suitable polymers can broadly be classified as thermoplastic polymers. However, suitable polymers can also exhibit a limited degree of cross-linking provided that they can still be dissolved in a solvent.

Suitable polymers include, but are not limited to, low density polyethylene, high density polyethylene, polypropylene, polystyrene, polyvinylchloride, acrylonitrile-butadiene-styrene terpolymers, styrene-acrylonitrile copolymers, styrene butadiene copolymers, poly(4-methyl-pentene-1), polybutylene, polyvinylidene chloride, polyvinyl butyral, chlorinated polyethylene, ethylene-vinyl acetate copolymers, polyvinyl acetate, polyvinyl alcohol, polymethyl-methacrylate, polymethyl-acrylate, ethylene-acrylic acid copolymers, ethylene-acrylic acid metal salt copolymers, polyesters such as polyethylene teraphthalate and polybutylene teraphthalate, polyamides such as Nylon 6, Nylon 11, Nylon 13, Nylon 66, polycarbonates and polysulfones, and polyarylene and polyalkylene oxides.

The method of the invention is particularly suitable for use in making porous polymer structures that may be used in tissue engineering applications. Polymers used in tissue engineering applications will generally be biocompatible and are preferably biodegradable. In addition to acting as adhesive substrates for cells, such polymers should also promote cell growth and allow retention of differentiated cell function, possess physical characteristics allowing for large surface to volume ratios, have sound mechanical properties and have an ability to be formed into complex shapes, such as for bone or cartilage substitutes.

Mechanical rigidity is an important property of polymers used in tissue engineering applications. Relatively high rigidity is advantageous to enable the porous polymer structure to withstand the contractile forces exerted by cells growing within the structure. The resulting porous polymer structure should also be rigid enough to maintain the desired shape under in vivo temperatures. Accordingly, the glass transition temperature ($T_g$), as measured by Differential Scanning Calorimetry (DSC), of the polymer is preferably sufficiently high so that the network of pores in the polymer structure does not collapse in vivo. A further parameter to consider when selecting a polymer for use in tissue engineering applications is the biodegradation kinetics of the polymer. In particular, it may be desirable that the biodegradation kinetics of the polymer match the healing rate associated with the specific in vivo application.

Examples of suitable polymers that may be used to make porous polymer structures for use in tissue engineering applications include, but are not limited to, aliphatic or aliphatic-co-aromatic polyesters including poly(α-hydroxyesters) and copolymers thereof such as polyglycolic acid (PGA), polylactic acid (PLA), poly(lactic-co-glycolic acid) (PLGA) (all stereo-isomeric forms thereof; polydioxanone; polyalkanoates such as poly(hydroxy butyrate) (PHB), poly(hydroxy valerate) (PHV) and co-polymers thereof (PHBV); and polyethylene oxide/polyethylene terephthalate as disclosed by Reed et al., in *Trans. Am. Soc. Artif. Intern. Organs*, page 109 (1977). Other suitable polymers include biodegradable and biocompatible polycaprolactones, and copolymers of polyesters, polycarbonates, polyanhydrides, poly(ortho esters), and copolymers of polyethylene oxide/polyethylene terphthalate.

Bisphenol-A based polyphosphoesters have also been suggested for use in biodegradable porous polymer design. Such polymers include poly(bisphenol-A phenylphosphate), poly(bisphenol-A ethylphosphate), poly(bisphenol-A ethylphosphonate), poly(bisphenol-A phenylphosphonate), poly[bis(2-ethoxy)hydrophosphonic terephthalate], and copolymers of bisphenol-A based poly(phosphoesters). Although these polymers have been suggested in U.S. Pat. No. 5,686,091, the known cytotoxicity of bisphenol-A makes them less preferred candidates for implantation.

Other polymers suitable for use in tissue engineering applications include polymers of tyrosine-derived diphenol compounds. Methods for preparing the tyrosine-derived diphenol monomers are disclosed in U.S. Pat. Nos. 5,587,507 and 5,670,602. The preferred diphenol monomers are des-amino-tyrosyl-tyrosine (DT) esters. These monomers have a free carboxylic acid group that can be used to attach a pendent chain. Usually, various alkyl ester pendent chains are employed, for example, ethyl ester, butyl ester, hexyl ester, octyl ester and benzyl ester pendant chains.

The tyrosine-derived diphenol compounds are used as monomeric starting materials for polycarbonates, polyiminocarbonates, polyarylates, polyurethanes, polyethers, and the like. Polycarbonates, polyiminocarbonates and methods of their preparation are disclosed in U.S. Pat. Nos. 5,099,060 and 5,198,507. Polyarylates and methods of their preparation are disclosed in U.S. Pat. No. 5,216,115. Block copolymers of polycarbonates and polyarylates with poly(alkylene oxides) and methods of their preparation are disclosed in U.S. Pat. No. 5,658,995. Strictly alternating poly(alkylene oxide ether) copolymers and methods of their preparation are disclosed in International Application No. PCT/US98/23737 filed Nov. 6, 1998.

Other polymers suitable for use in tissue engineering applications include the polycarbonates, polyimino-carbonates, polyarylates, polyurethanes, strictly alternating poly(alkylene oxide ethers) and poly(alkylene oxide) block copolymers polymerised from dihydroxy monomers prepared from α-, β- and γ-hydroxy acids and derivatives of tyrosine. The preparation of the dihydroxy monomers and methods of their polymerisation are disclosed in International Patent Application No. PCT/US98/036013.

Polycarbonates, polyimino carbonates, polyarylates, poly(alkylene oxide) block copolymers and polyethers of the diphenol and dihydroxy tyrosine monomers that contain iodine atoms or that contain free carboxylic acid pendent chains may also be employed. Iodine-containing polymers are radio-opaque. These polymers and methods of preparation are disclosed in International Patent Application No. PCT/US98/23777 filed Nov. 6, 1998. Polymers containing free carboxylic acid pendent chains and methods of preparation are disclosed in U.S. patent application Ser. No. 09/56,050, filed Apr. 7, 1998.

Preferred polymers that may be used in accordance with the invention to prepare porous polymer structures for use in tissue engineering applications include, but are not limited to, poly(α-hydroxyesters).

The liquid composition used in accordance with the invention will generally be prepared by heating the at least one polymer and the at least one solvent with stirring to a temperature required to dissolve a sufficient amount of polymer in the solvent. Preferably, substantially all of the polymer used will be dissolved in the solvent to form a clear homogeneous solution.

Given the diverse array of solvents and polymers that may be used in accordance with the invention, those skilled in the art will appreciate that the absolute predictability for predetermining the solvating capacity of a particular solvent for a particular polymer is not possible. However, some useful general guidelines can be set forth. Thus, when the selected polymer is non-polar, a non-polar material with a similar solubility parameter at the solution temperature is more likely to function as a solvent. When such parameters are not available, room temperature solubility parameters can also be referred to for general guidance. Similarly, when the selected polymer is polar, a polar material with a similar solubility parameter is more likely to function as a solvent. Also, good solvent properties can be obtained if the relative polarity or non-polarity of the solvent is matched with the relative polarity or non-polarity of the polymer. Furthermore, if the selected polymer has hydrophobic character, useful solvents will typically have little or no water solubility. Conversely, if the selected polymer has hydrophilic character, useful solvents will typically have some or good water solubility.

As to the chemical nature of suitable solvents, particular classes of various organic compounds have been found useful, including aliphatic and aromatic acids, aliphatic, aromatic and cyclic alcohols, aldehydes, primary and secondary amines, aromatic and ethoxylated amines, diamines, amides, esters and diesters, ethers, ketones and various hydrocarbons and heterocycles and combinations thereof. Despite the diverse array of potentially suitable solvents, those skilled in the art will appreciate that the suitability of a particular solvent can be quite selective. Thus, for example, not all aromatic acids will be useful as a solvent for a given polymer and, further, not all solvents useful to dissolve a polymer such as polyethylene will necessarily be useful to dissolve a polymer such as polystyrene.

It will also be appreciated that the solvating ability of a given material can be greatly influenced by temperature and pressure.

While most suitable solvents will be in a liquid state at ambient temperatures, solvents which are solid at room temperature may also be employed so long as the liquid composition comprising the polymer can be formed at elevated temperatures and solidification of the solvent at lower temperatures does not interfere with the formation of the porous polymer structure. More specifically, a "solid solvent" may be used so long as the liquid composition can form the bi-continuous phase separated composition.

The ratio of the at least one solvent to the dissolved at least one polymer used in accordance with the invention will vary depending upon the selected operating temperature, the type of solvent(s) and polymer(s) selected, and also the desired morphology and application of the resultant porous polymer structure. Thus, where a more dense porous polymer structure is required the polymer(s) and solvent(s) should be selected to provide a liquid composition having a relatively high dissolved polymer concentration. Conversely, where a highly porous low density porous polymer structure is required, the polymer(s) and solvent(s) should be selected to provide a liquid composition having a relatively low dissolved polymer concentration.

Generally, the amount of polymer(s) dissolved in the liquid composition will range from about 0.5 to about 50, preferably from about 1 to about 20, more preferably from about 1 to about 10, most preferably from about 2 to about 10 weight percent relative to the total weight of the liquid composition.

In performing the method of the invention it may be preferable to include a non-solvent in the liquid composition to facilitate the formation of the bi-continuous phase separated composition. The addition of a non-solvent will generally cause a reduction in the interaction parameter between the solvent(s) and the polymer and promote phase separation of the liquid composition. The nature of the non-solvent will generally be selected such that it is miscible with the at least one solvent. It will be appreciated that as the percentage of non-solvent in the liquid composition is increased, the solubility of the at least one polymer in the liquid composition will correspondingly be decreased. Thus, as shown in FIG. 1, the incorporation of a non-solvent in the liquid composition will generally result in a solubility limit ($\phi_2$) below which the at least one polymer is substantially insoluble at all temperatures under standard atmospheric pressure. It will also be appreciated that a material which functions as a solvent for one polymer may function as a non-solvent for another polymer, and vice versa. Thus, when a non-solvent is to be used in accordance with the method of the invention it can be selected using the general principles outlined above.

Where the invention is employed to prepare a porous polymer structure for use in tissue engineering applications a number of further criteria may be considered in selecting a suitable solvent or solvent/non-solvent combination. Generally, such solvents/non-solvents should have low toxicity and be capable of being thoroughly removed from the resulting porous polymer.

Examples of suitable solvents, or non-solvents as the case may be, that may be used to prepare a porous polymer structure for use in tissue engineering applications include, but are not limited to, dimethyl oxalate (DMO), ethylene carbonate (EC), N-methyl acetamide (NMA), dimethyl sulfoxide (DMSO), acetic acid (AA), 1,4-dioxane (DO), dimethyl carbonate (DMC), chloroform, dichloromethane (DCM), naphthalene, sulfalene, trimethylurea, ethylene glycol and related glycols or polyglycols, N-methyl pyrrolidone (NMP), ethylene carbonate, hexane, trifluoroethanol (TFE), ethanol, acedtic acid, water, and combinations thereof.

The solvents/non-solvents listed in the immediately preceding paragraph are preferred when used with poly(α-hydroxyesters) such as PGA, PLA and PLGA.

Preferred liquid compositions used in accordance with the invention may include the following component combinations:

| Polymer (% wt) | Solvent (% wt) | Non-solvent (% wt) |
| --- | --- | --- |
| 0.5-10% PLGA | 80-100% 1,4-dioxane | 0-20% water |
| 0.5-10% PLGA | 0-100% DMSO | 0-10% water |
| 0.5-5% Polyurethane | 0-100% DMSO | 0-10% water |
| 0.5-20% PHBV | 0-100% 1,4-dioxane | 0-10% water |

| Polymer (% wt) | Solvent (% wt) | Non-solvent (% wt) |
| --- | --- | --- |
| 0.5-10% polystyrene | 0-100% 1,4-dioxane | 0-10% water |
| 0.5-10% PLA | 80-100% 1,4-dioxane | 0-20% water |
| 0.5-10% PDLA | 80-100% 1,4-dioxane | 0-20% water |
| 0.5-10% PLLA | 80-100% 1,4-dioxane | 0-20% water |
| 0.5-10% PLGA | 80-100% ethylene carbonate | 0-20% ethylene glycol |
| 0.5-20% PCL | 80-100% 1,4-dioxane | 0-20% water |
| 0.5-20% PCL | 0-100% DMSO | 0-10% water |

As will be appreciated from the foregoing, the practical operating window for performing the method of the invention can vary as a function of temperature, polymer concentration, and/or solvent or solvent/non-solvent composition for a specific liquid composition. Phase diagrams can provide considerable detail on the relationship between temperature, polymer concentration and solvent/non-solvent compositions for a given liquid composition. Such diagrams can advantageously be used to assist in the preparation of an appropriate liquid composition for a given polymer/solvent or polymer/solvent/non-solvent system when performing the method of the invention. Phase diagrams for a number of polymer/solvent or polymer/solvent/non-solvent systems are generally known to those skilled in the art. However, where a specific phase diagram is not available, the curves can be determined by known techniques. For example, a suitable technique is described in Flory P. J. Principles of polymer chemistry, Ithaca:Cornell University Press, 1953; Olabisi O. Polymer-polymer miscibility, New York, Academic Press, 1979.; Lloyd D. R., Kim S. S, and Kinzer K. E. Journal of Membrane Science 1991, 64 (1-2), 1-11; Kim S. S, and Lloyd D. R. Polymer 1992, 33 (5), 1047-57; and Flory P. J. Discussions of the Faraday Society 1970, No. 49 (7-29).

FIGS. 3 to 6 detail phase data for a 4% (w/v) poly(lactic-co-glycolic acid), 1,4-dioxane and water liquid composition. The manner in which the predicted phase diagram shown in FIG. 4 was derived is discussed below.

Figure 3:
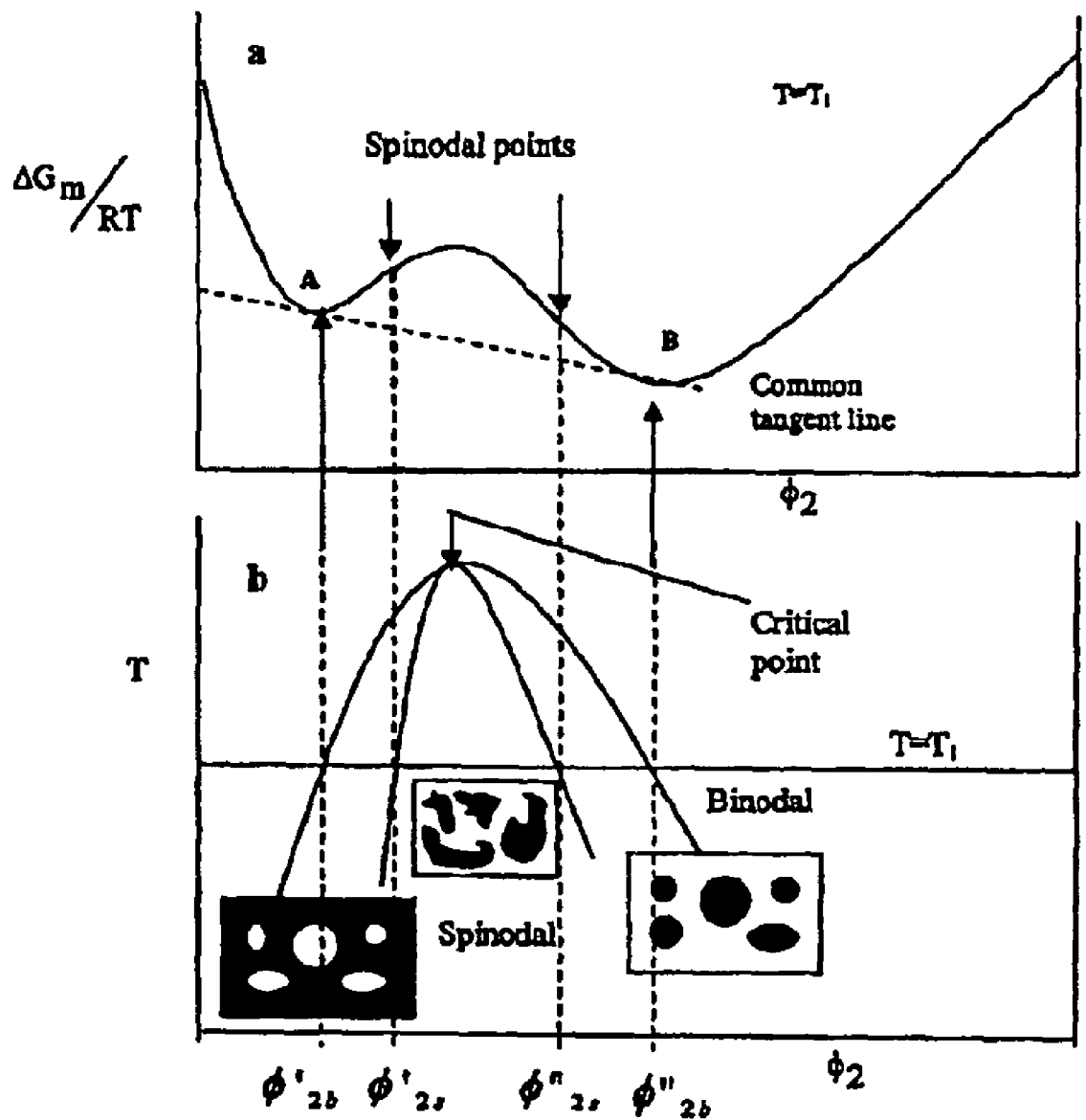
FIG. 3 illustrates the correlation between Gibbs free energy of a liquid composition with its binodal and spinodal curves of a phase diagram.

FIG. 3 shows the change in Gibbs free energy of a poly(lactic-co-glycolic acid), 1,4-dioxane and water liquid composition and its correlation with the spinodal and binodal curves as a function of volume fraction. The criteria for miscibility in any two component polymer-diluent system can be expressed in terms of the Gibbs free energy of mixing, $\Delta G_{mix}$ and its second derivative with respect to polymer volume fraction, $\phi_2$, at fixed temperature, T and pressure, P, $$\Delta G_{mix} < 0, \qquad (1)$$

$$(\delta^2 \Delta G_{mix}/\delta\phi_2^2)_{T,P} > 0, \qquad (2)$$

where $\Delta G_{mix} = \Delta H_{mix} - T \Delta S_{mix}$, with $\Delta H_{mix}$ and $\Delta S_{mix}$ representing the enthalpy and entropy of mixing, respectively [Lloyd D. R., et al, J. Membrane Sci 1991; 64(1-2):1-11]. If either criterion is not met, the solution may separate into two phases in equilibrium.

In the case of a partially miscible system, a homogeneous one-phase solution is formed only under certain conditions of composition and temperature. If a common tangent line is drawn on the $\Delta G_{mix}/RT$ versus $\phi_2$ plot, as shown in FIG. 3, the co-tangential points are called binodal points ($\phi'_{2b}$ and $\phi''_{2b}$). At the binodal points at $T=T_1$, equations (3) and (4) must be satisfied.

$$\left[\frac{\partial(\Delta G'/RT)}{\partial \phi_2}\right]_{\phi_2=\phi'_{2b}} = \left[\frac{\partial(\Delta G'/RT)}{\partial \phi_2}\right]_{\phi_2=\phi''_{2b}} \quad (3)$$

$$(\Delta G'_m/RT)' - \left[\frac{\partial(\Delta G'_m/RT)}{\partial \phi_2}\right]_{\phi_2=\phi'_{2b}} \phi'_{2b} = \quad (4)$$

$$(\Delta G'_m/RT)'' - \left[\frac{\partial(\Delta G'/RT)}{\partial \phi_2}\right]_{\phi_2=\phi''_{2b}} \phi''_{2b}$$

The locus of the binodal points at various temperatures makes a binodal curve. As shown in FIG. 3, at the spinodal points ($\phi'_{2s}$, and $\phi''_{2s}$) equation (5) is satisfied at a certain temperature (T=$T_1$):

$$(\delta^2 \Delta G_{mix}/\delta\phi_2^2)_{T,P}=0, \quad (5)$$

The spinodal points at various temperatures make a locus called a spinodal curve (FIG. 3). Below the spinodal curve, the system is unstable and spinodal decomposition occurs. Spinodal decomposition is a kinetic process of generating within an unstable mother phase a spontaneous and continuous growth of another phase. The growth originates from small amplitude composition fluctuations which statistically promote continuous and rapid growth of the sinusoidal composition modulation with a certain maximum wavelength (Olabisi O. Polymer-polymer miscibility, New York: Academic Press, 1979). The decomposed system is characterized at some point by a high level of phase interconnectivity in both the minor and major phases—a structure which could possess unusual mechanical and permeability characteristics.

Figure 4:
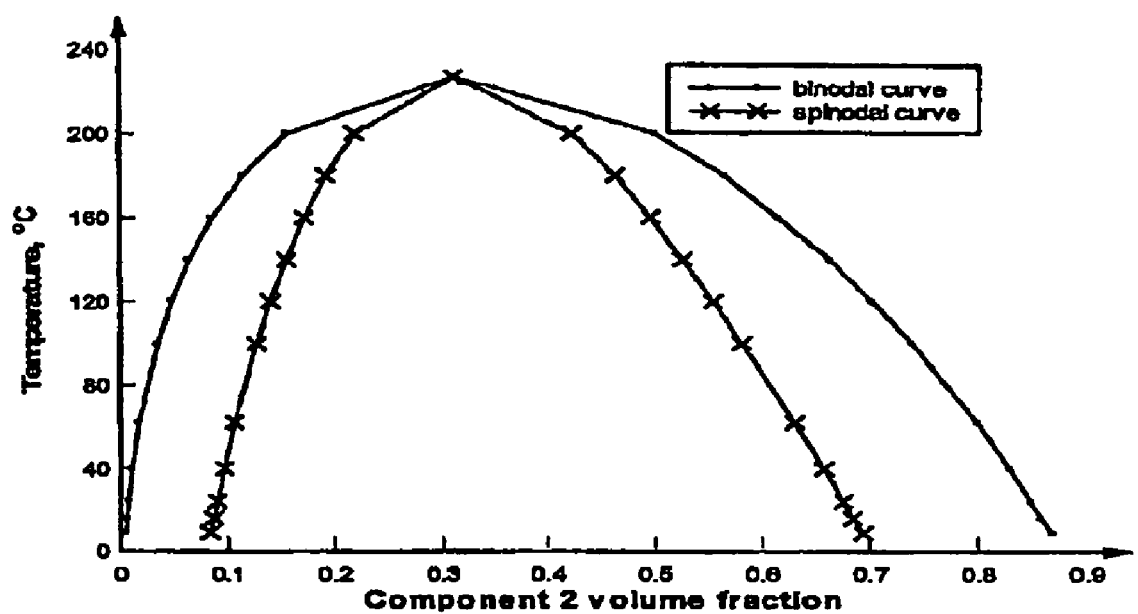
FIG. 4 illustrates the predicted binodal and spinodal curves derived for a 4% (w/v) poly(lactic-co-glycolic acid), 1,4-dioxane and water liquid composition.

FIG. 4 is a predicted phase diagram for a 4% (w/v) poly (lactic-co-glycolic acid), 1,4-dioxane and water liquid composition based on the measurement of cloud points at 80-100% volume fractions. Biomedical grade, white granular solid 75/25 poly(D,L-lactic-co-glycolic acid) (PLGA) with a molecular weight of 144,000 kDa was dissolved in 1,4-dioxane. Purified water with a resistivity of 18 MΩ at 25° C. was used as the non-solvent to PLGA. The composition was then homogenized by stirring them firstly at 60° C. for 1 hour prior to being immersed in a water bath set at a temperature ca. 15° C. higher than its dissolution temperature. The bath temperature was decreased at 0.1° C./min. The cloud point temperature was taken as the temperature at which the clear solution became visibly turbid.

According to Lloyd, J. Membrane Sci., 1991; 64(1-2):1-11, the binodal curve can be obtained by measuring a mixture's cloud point temperature, based on the assumption that the cooling rate has a relatively minor effect on the location of the cloud points curve. Accordingly, the cloud point temperatures for the 4% PLGA-dioxane-water system were determined by visual turbidimetry for temperatures between 80-100° C. The remaining of the spinodal and bimodal curves were predicted based on the below methodology.

A complete phase diagram for a ternary system is complex and difficult to predict. After considering the respective interaction parameters XI between the three components, the system may be simplified to a binary system by considering water, as component 1, and PLGA-dioxane, as component 2. A similar assumption is possible for many other solvent-nonsolvent-polymer systems often used in TIPS scaffold manufacture.

The spinodal point was calculated assuming: 1) the $\chi_1$ value is independent of composition; and 2) $\chi_1$ is assumed to have a temperature dependence of $\chi_1(T)=\alpha+\beta/T$ (McGuire K. S., Laxminarayan A. and Lloyd D. R. Polymer 1994; 35(20): 4404-7). By simultaneously solving equations (3) and (4) with the cloud point composition, $\chi_1$ and the composition of component 2 (PLGA-dioxane) within the component 2 lean phase were determined as a function of temperature. $\chi_1$ calculated at a specific temperature was then utilized in equation (5) in order to obtain the spinodal composition at that temperature. $\chi_c$ and $\phi_c$ were calculated from $\partial^2 \Delta G_m/\partial\phi_2^2=0$ and $\partial^3 \Delta G_m/\partial\phi_2^3=0$ and the UCST was calculated by applying $\chi_c$ into $\chi_1(T)=\alpha+\beta/T$.

Binodal curves were determined, at each temperature. There are two binodal points: one at the component 2 lean phase ($\phi'_{2b}$) and the other at the component 2 rich phase ($\phi''_{2b}$). They were estimated by a graphical method to satisfy the conditions of having a common tangent and intercept as shown in equation (4) and (5). At each temperature, $\phi'_{2b}$ and $\phi''_{2b}$ were calculated from the intersection of the plot of $\partial(\Delta G'/RT)/\partial\phi_2$ versus $(\Delta G'/RT)-[\partial(\Delta G'/RT)\partial\phi_2]\phi_2$ for the component 2 lean and component 2 rich phase regions (Kim S. S, and Lloyd D. R., *Polymer* 1992; 33(5):1047-57.).

The spinodal point has been calculated using Flory's lattice theory for a two component system (shown above to be a relevant standpoint for representing this ternary system) and by assuming cloud point temperatures to be representative of the coexistence curve (binodal line). In this calculation, the Gibbs free energy of mixing per lattice site is used. The Gibbs free energy of mixing per lattice site is obtained by dividing equation (6) by the total number of lattice sites, Q.

$$\frac{\Delta G_{mix}}{RT} = n_1 \ln\phi_1 + n_2 \ln\phi_2 + \chi_1 n_1 \phi_2 \quad (6)$$

Q may be calculated by the following relationship, $$Q = n_1 + n_2 m \quad (7)$$

where $n_1$ and $n_2$ represent the number of moles for component 1 (water) and 2 (PLGA-dioxane) respectively. With this calculation, one assumes that a component 1 molecule occupies one lattice site and m lattice sites are being occupied by a component 2 molecule. m in this case is taken to be the ratio of molecular volume for component 2 and component 1 [Flory P. J., Orwoll R. A. and Vrij A. J. American Chemical Society 1964; 86(17):3507-14]. The Gibbs free energy of mixing per lattice site is expressed as $$\frac{\Delta G'_m}{RT} = \ln(1-\phi_2) - \phi_2 \ln(1-\phi_2) + \frac{\phi_2}{m}\ln\phi_2 + \chi_1 \phi_2 - \chi_1 \phi_2^2 \quad (8)$$

By simultaneously solving equation (3) and (4) with $\phi''_{2b}$ (the cloud point concentration) known, and by assuming that $\chi_1$ is not concentration dependent, $\chi_1$ and $\phi'_{2b}$ (concentration of component 2 in the component 2 lean phase) at that cloud point temperature are determined. $\chi_1$ calculated at a specific temperature is further utilized in equation (5) in order to obtain the spinodal composition at that temperature. $\chi_c$ and $\phi_c$ are calculated using the equations $\partial^2 \Delta G_m/\partial\phi_2^2=0$ and $\partial^3 \Delta G_m/\partial\phi_2^3=0$.

From the empirically measured data for the binodal curve, of cloud point data, at concentrations of greater than 80% volume fraction, using the method outlined above it is possible to calculate a complete phase diagram for this ternary (pseudo binary) system, as shown in FIG. 4. FIG. 4 shows the calculated complete binodal and spinodal curves for 4% (wt/v) PLGA in dioxane and water mixtures, inclusive of measured binodal data.

This combined measured and predictive data allow for the determination of phase diagrams of polymer-solvent-nonsolvent systems where composition characterisations or phase diagrams can not be determined empirically due to the dissolution temperatures and phase transitions for the systems.

Figure 5:
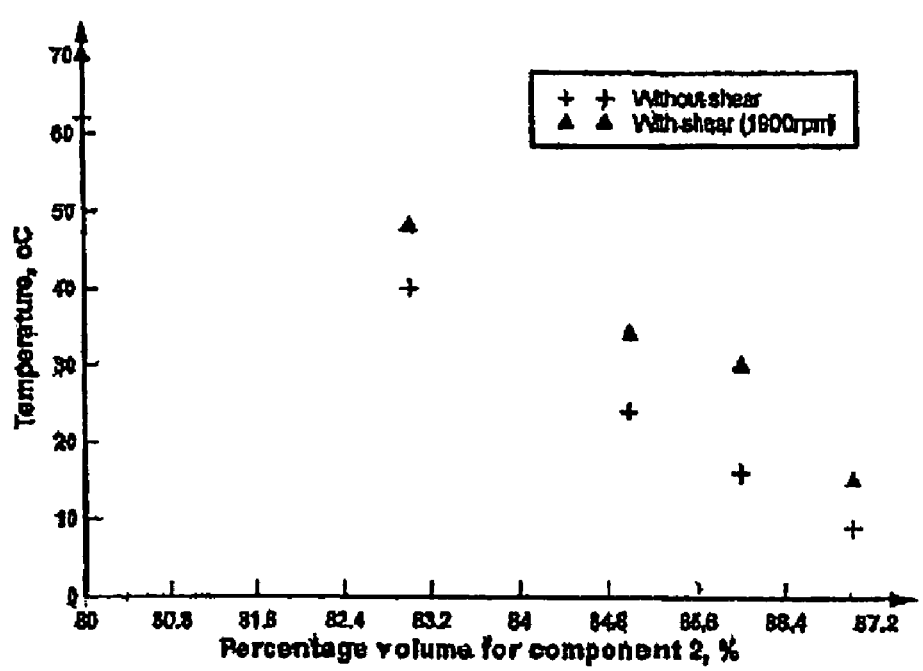
FIG. 5 illustrates the effect of shear on the cloud point temperature (bimodal phase boundary) of a 4% (w/v) poly (lactic-co-glycolic acid) [component 1], 1,4-dioxane and water liquid composition.

FIG. 5 represents the effect of shear on phase separation, measured by cloud point temperature, for a 4% (w/v) poly (lactic-co-glycolic acid), 1,4-dioxane and water liquid composition. The results were obtained by making 4% (w/v) poly(lactic-co-glycolic acid), 1,4-dioxane and water solutions are various volume fractions. The solutions were heated until clear prior to being placed into the apparatus of FIG. 9 (discussed in more detail below) and then into a temperature controlled water bath, set at 20° C. The temperature of the water bath was reduced at a rate of 0.1° C. per minute and the turbidity of the solution observed. The temperature at which the solution turned cloudy was noted as the cloud temperature for the liquid composition when under shear conditions. It can be seen from FIG. 5 that at various volume fractions of component 1 (PLGA) that the application of a 1900 rpm rotation rate to the liquid composition caused the cloud point temperature to increase between approximately 5-12° C.

Figure 6:
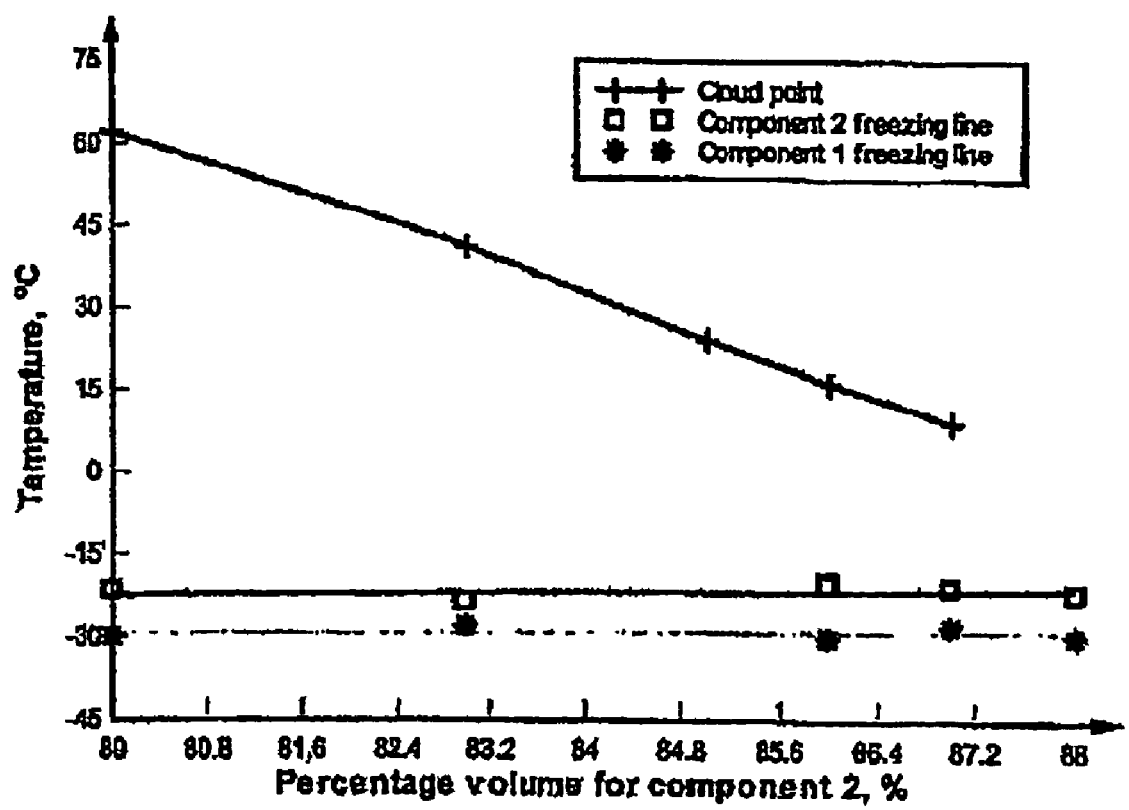
FIG. 6 illustrates the phase diagram derived from a 4% (w/v) poly(lactic-co-glycolic acid), 1,4-dioxane and water liquid composition subject to rotational shear.

FIG. 6 illustrates that as the volume fraction of PLGA and dioxane (component 2) within the liquid composition increases there is a rapid drop in the cloud point temperatures of the liquid composition, whilst the freezing temperatures of each of component 1 and 2 (as defined above) are constant over this range of composition.

Figure 7:
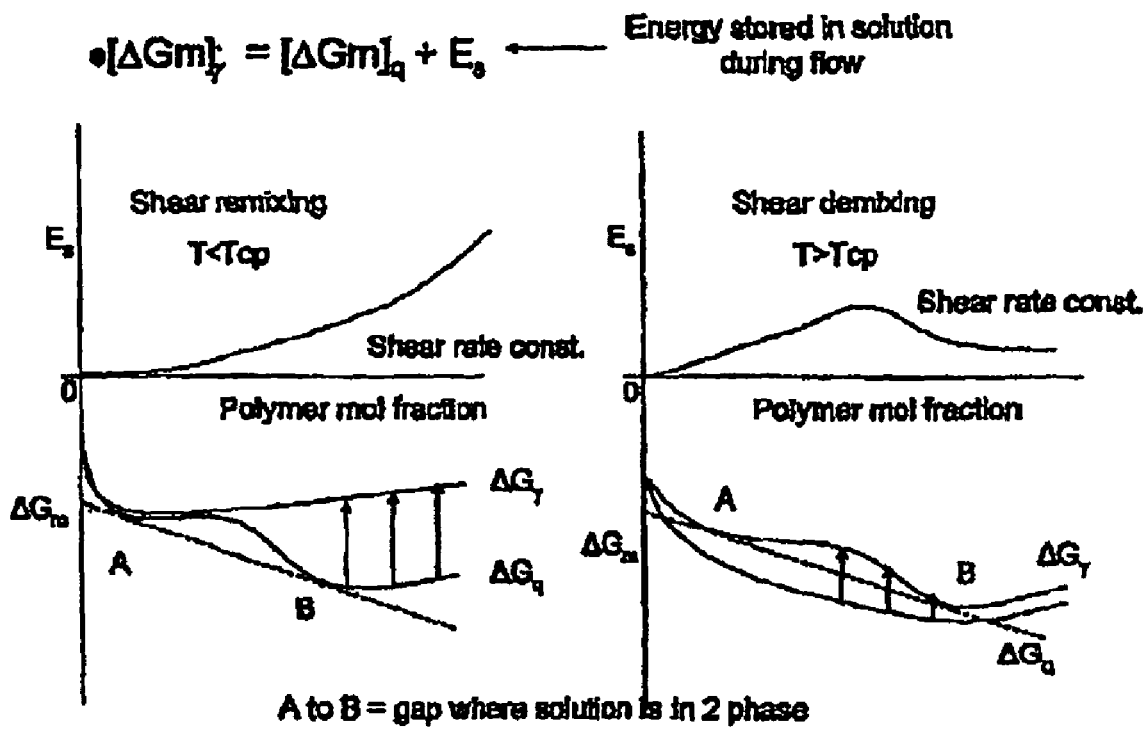
FIG. 7 illustrates the possible effects of shear on the free energy curve (and hence the resulting thermodynamic state) of a polymer solution at constant temperature as a function of polymer concentration.

FIG. 7 shows graphically the possible effects of shear on the value of $\Delta Gm$ over a range of polymer concentrations for a polymer solution at two different temperatures. In this figure $\Delta Gq$ represents the value of $\Delta Gm$ under quiescent conditions (i.e. no shear), whilst $\Delta Gs$ represents the value of $\Delta Gm$ under shear conditions. The plot on the left hand side (LHS) of FIG. 7 represents a system at a temperature (T) less than the cloud point temperature (T<Tcp), such that, if the particular polymer solution is at a concentration between A and B, it will have a higher value of $\Delta Gq$ compared to A and B (that is, there is a maximum in $\Delta Gq$ with concentration). Any solution in this range of concentration at this chosen temperature, in trying to minimise its $\Delta Gq$, will phase separate into two phases where each phase has a specific concentration of both A and B. However, if the solution is at a temperate (T) above its cloud point temperature (T>Tcp), as is represented by the plot on the right hand side (RHS) of FIG. 7, there will be no maxima in the $\Delta Gq$ curve so the solution will always be in a stable condition over a range of concentration. When a solution made up of small molecules is placed under shear the molecules can relax back to their unsheared state quickly as their characteristic relaxation times are short.

However, when a solution which contains polymer is sheared the polymer does not dissipate the energy fast enough and the amount of energy stored by the polymer (Es) determines the effective value of $\Delta Gs$ ($\Delta Gs=\Delta Gq+Es$) for a given polymer concentration, which in turn determines the thermodynamic state of the system. With reference to the plot of $\Delta Gm$, Es versus polymer concentration on the LHS of FIG. 7, if at a particular temperature below the cloud point temperature of the solution the value of Es increases monotonically with polymer concentration, that is the Es curve runs above its tangent as a function of polymer concentration, the resultant curve $\Delta Gs$ post the application of a shear stress no longer has a miscibility gap (from A to B) (i.e. shear-induced remixing).

However, with reference to the plot of $\Delta Gm$, Es versus polymer concentration on the RHS of FIG. 7, where the particular polymer solution is at a temperature above its cloud point temperature, and the Es curve displays a maximum as a function of polymer concentration, the introduction of a shear stress causes the solution to phase separate in the region of concentrations where the maximum in the Es curve occurs. This is due to the values of Es introducing a maximum in the resultant $\Delta Gs$ curve post the application of a shear stress, producing a miscibility gap (from A to B) (i.e. shear-induced demixing).

In accordance with the invention, the liquid composition is subjected to stress. As previously mentioned, the application of stress to the liquid composition has the effect of altering the thermodynamic behaviour of its phase separation such that the phase separation boundaries are shifted compared with their location in the absence of such stress. Prior to being subjected to stress, the liquid composition may be present as a single-phase system (i.e. as defined in a state above the binodal curve) or as a two phase system (i.e. as defined in a state below the binodal curve) with reference to its specific phase diagram. Generally, prior to the application of stress the liquid composition will be present as a single-phase system or as a two-phase discontinuous system (i.e. as defined in a state between the spinodal and binodal curves). Preferably, prior to the application of stress the liquid composition is present as a single-phase system.

Figure 8:
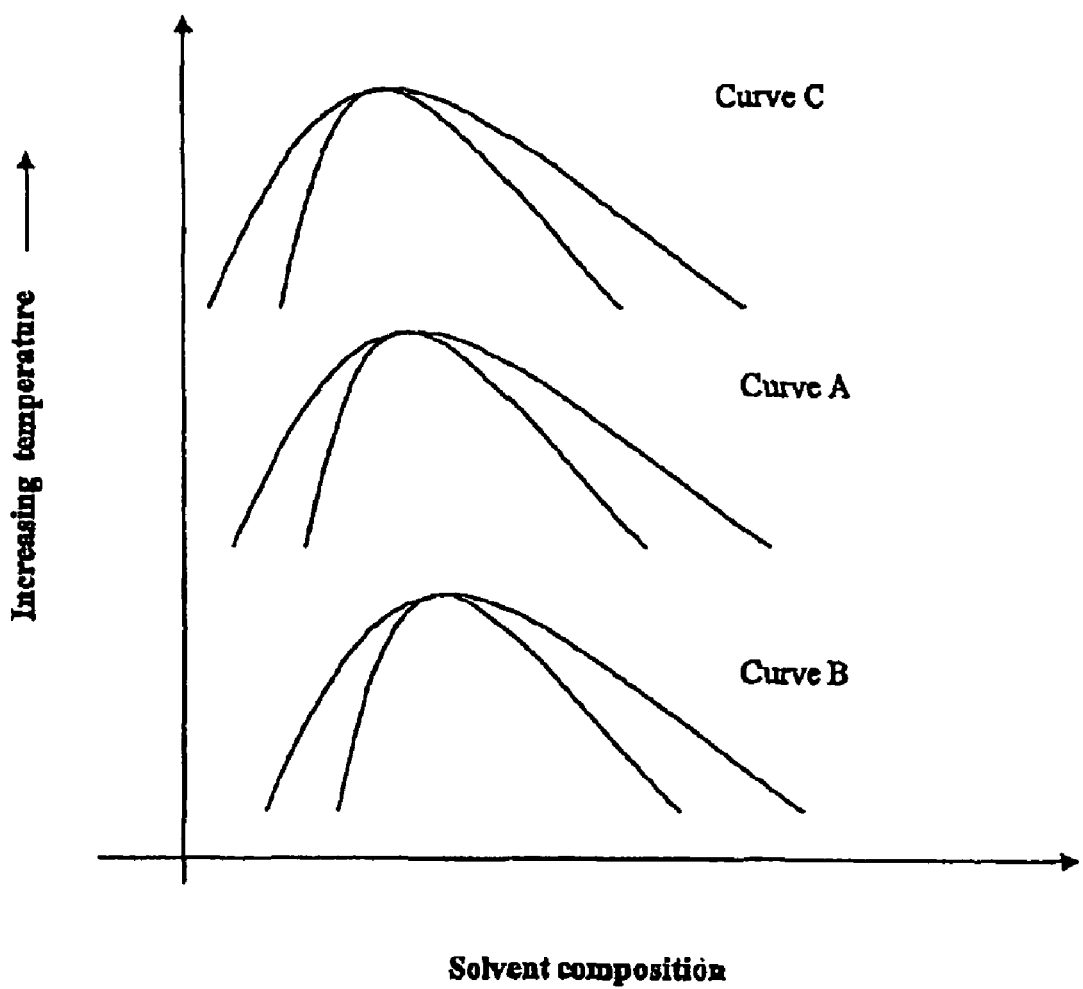
FIG. 8 illustrates the effect of applying stress to a liquid composition on the phase separation boundaries.

Depending upon the make up of the liquid composition, the effect of subjecting it to stress may cause the phase separation boundaries to shift in a direction which is above or below their original location in the absence of such stress. In particular, as illustrated in FIG. 8, the phase separation boundaries will generally shift in an upward direction (curve C) if the applied stress causes the Gibbs free energy of mixing to increase, whereas the phase separation boundaries will generally shift in a downward direction (curve B) if the applied stress causes the Gibbs free energy of mixing to decrease. Curve A represents the phase separation boundaries of the liquid composition in the absence of applied stress.

In the case where the applied stress causes the Gibbs free energy of mixing to decrease (i.e. curve B in FIG. 8), the upper critical temperature of the curves correspondingly decreases and therefore enables the liquid composition to form a single-phase or two-phase composition at lower temperatures. This may prove particularly useful in forming porous polymers using a liquid composition that comprises temperature sensitive materials. However, it will be appreciated that this downward shift in the phase separation boundaries also reduces the temperature at which spinodal decomposition will occur.

In the case where the application of stress causes the Gibbs free energy of mixing to increase (i.e. curve C in FIG. 8), the upper critical temperature of the curves correspondingly increases which in turn increases the temperature at which the liquid composition can form a single-phase or two-phase composition. Notably, this increase in the upper critical temperature of the curves also inherently provides for the advantageous effect of increasing the temperature at which spinodal decomposition can occur.

The magnitude and direction of shift in the phase separation boundaries for a given liquid composition that is subjected to stress can be readily determined by experiment as outlined above. However, without wishing to be limited by theory it is believed that the magnitude and direction of shift can also be predicted by measuring the first normal stress difference of a given liquid composition at different shear rates. In general, it is believed that the magnitude of the shift increases with the amount of applied stress.

It will be noted that FIG. 8 shows a horizontal shift in the phase diagrams with a change in temperature. It is believed that this change is as a result of a change in the Gibbs free energy of the composition as a function of temperature.

In accordance with the method of the invention the liquid composition is subjected to stress, and if necessary also to a reduction in temperature, to promote the formation of a bi-continuous phase separated composition. In other words, the liquid composition may simply be subjected to stress in order to promote or cause the formation of a bi-continuous phase separated composition. Alternatively, while the liquid composition is in a stressed state it may also be necessary to reduce the temperature of the liquid composition in order to promote or cause the formation of a bi-continuous phase separated composition. It will be appreciated that the direction and degree of shift of the phase separation boundaries caused by the application of stress, and/or the temperature of the liquid composition at the time it is stressed, will influence whether the temperature of the liquid composition will need to be reduced in order to promote the formation of the bi-continuous phase separated composition.

The need, or not, to reduce the temperature of the liquid composition to promote the formation of the bi-continuous phase separated composition can be further explained with reference to FIG. 2. Thus, prior to the application of stress, curve A may represent the phase separation boundaries for a given liquid composition. Relative to curve A, at point Z the liquid composition would exist as a homogenous single-phase system being at temperature T4'. Upon applying stress to this liquid composition the phase separation boundaries shift and may be defined by curve B. While the liquid composition is in a stressed state, point Z now resides in the unstable region and will undergo spinodal decomposition to form the bi-continuous phase separated composition. In this example, due to the temperature of the liquid composition at the time of stress (T4'), and the direction and degree of shift of the phase separation boundaries caused by the application of stress, it would not be necessary to also reduce the temperature of the liquid composition in order to promote the formation of the bi-continuous phase separated composition.

Figure 2:
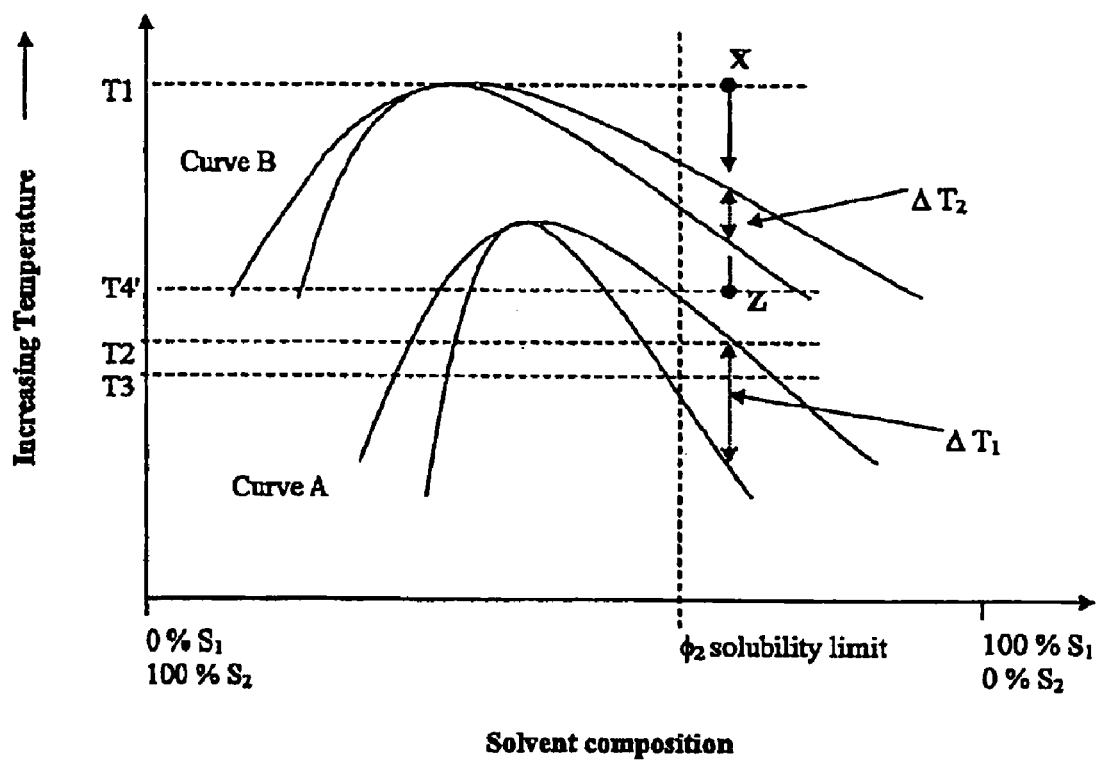
FIG. 2 illustrates the effect on the phase separation boundaries shown in FIG. 1 upon the application of stress to the polymer solution.

Relative to curve A, at point X in FIG. 2 the liquid composition would also exist as a single-phase system. However, point X is at the higher temperature T1. As a result of being at this higher temperature, the liquid composition remains as a single-phase system despite the shift in the phase separation boundaries represented by curve B. In this case, it would be necessary to also reduce the temperature of the liquid composition, for example to temperature T4', to promote the formation of the bi-continuous phase separated composition.

For avoidance of any doubt, it will be understood that where it is necessary to reduce the temperature of the liquid composition (to promote the formation of the bi-continuous phase separated composition), the temperature reduction will need to occur while the liquid composition is in a state of stress in order to achieve the advantages of the invention. Given that the physical effect of applying stress to or reducing the temperature of the liquid composition can take some time to dissipate, it will be appreciated that the act of applying the stress and reducing the temperature need not necessarily occur at the same time. In other words, the advantages of the invention can be realised provided the liquid composition is in a state of stress at a temperature that promotes formation of the bi-continuous phase separated composition. Where a temperature reduction of the liquid composition is required, generally stress is applied to the liquid composition while its temperature is being simultaneously reduced.

In accordance with the method of the invention, stress is applied to the liquid composition at least until a time at which the liquid composition forms a bi-continuous phase separated composition. Once the bi-continuous phase separated composition forms, the stress may be discontinued and the at least one polymer is solidified by any suitable means. Means for solidifying the at least one polymer will be discussed below. Alternatively, having formed the bi-continuous phase separated composition the stress can be maintained at any time up until, or even after, the at least one polymer solidifies. As to whether the stress is maintained after the formation of the bi-continuous phase separated composition will depend upon factors such as the technique being used to apply the stress, the desired morphology of the porous polymer structure and the intended application of the porous polymer structure.

Stress may be applied to the liquid composition using any suitable means. As previously mentioned, stress may be defined in terms of pressure and flow components. Suitable techniques for applying at least shear and extensional flow stresses to liquid compositions include, but are not limited to, stirring using a rotating stirring element, and pumping the liquid through confined spaces such as in an extrusion process.

Suitable techniques for subjecting a liquid composition to pressure include, but are not limited to, increasing the gas pressure surrounding the liquid, compressing the liquid under a mechanical force such as in an extrusion or injection moulding process, and subjecting the liquid to ultrasonic waves.

A combination of stresses may be applied to the liquid composition in an alternating fashion or at the same time. Those skilled in the art will appreciate that many techniques which can be used to apply shear and/or extensional stress to a liquid composition will also inherently apply pressure or a compressive stress at the same time, and vice versa. For example, an injection moulding process will generally subject a liquid composition to both flow and pressure forces or stresses, as does the application of ultrasound.

Depending upon the technique employed to provide the stress, and how that technique is applied in practice, variations in the level of stress can be applied or developed across the liquid composition. The variations may be discrete or continuous. The variations may take the form of a stress gradient which may or may not develop throughout the liquid composition. Where a stress gradient or variations in the level of stress does not develop in the liquid composition, the resulting porous polymer structure will generally have a cross section with a substantially uniform cellular structure.

Where a stress gradient or variations in stress levels do develop throughout the liquid composition different morphologies can be formed across the gradient or at different levels of stress. Hence the porous polymer structure can be formed with a cross section exhibiting regions of different morphology. In particular, stress gradients in the liquid composition can advantageously be used and manipulated to prepare porous polymer structures having a unique layered arrangement, with each layer having a different morphology. Additionally a temperature gradient may be applied across the liquid composition, to produce regions of different morphology.

Figure 9:
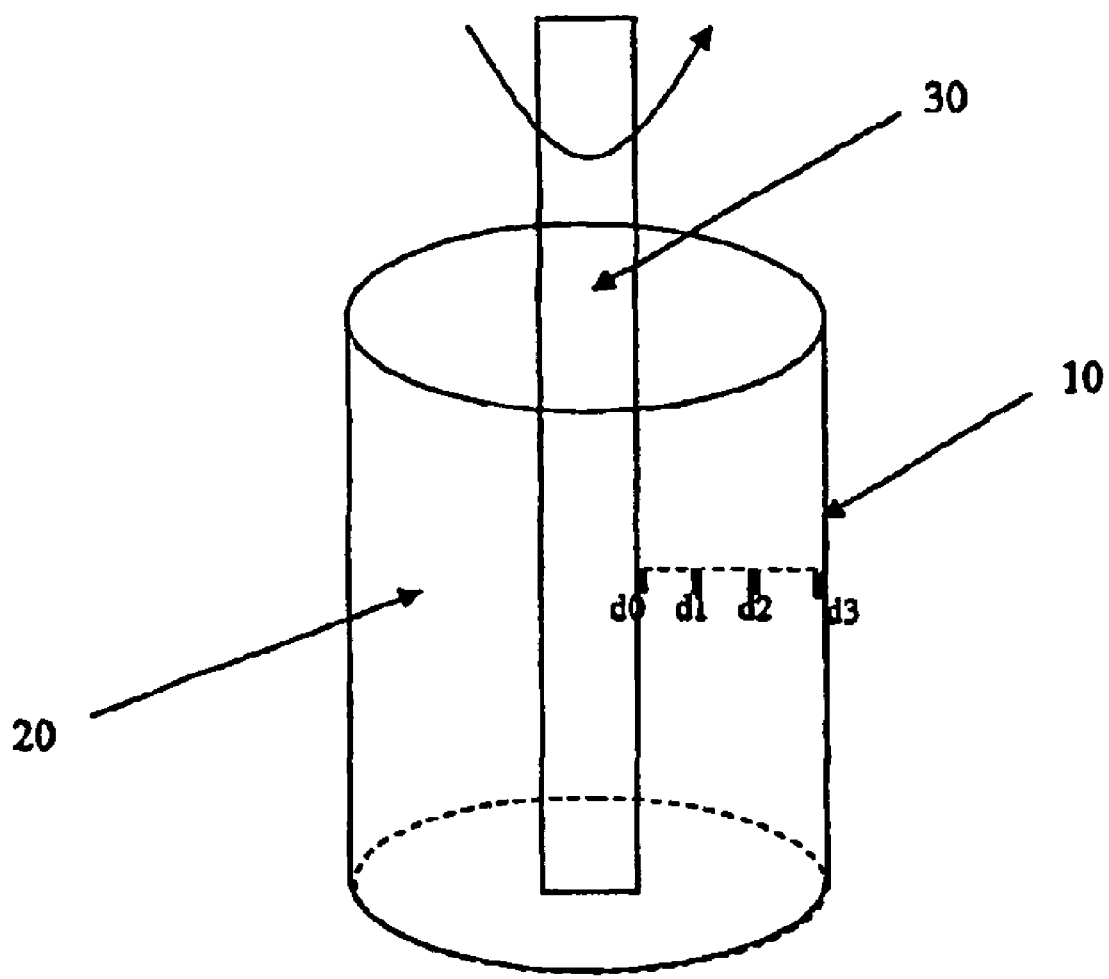
FIG. 9 illustrates an apparatus that may be used to prepare a porous polymer structure in accordance with the invention.
Figure 10:
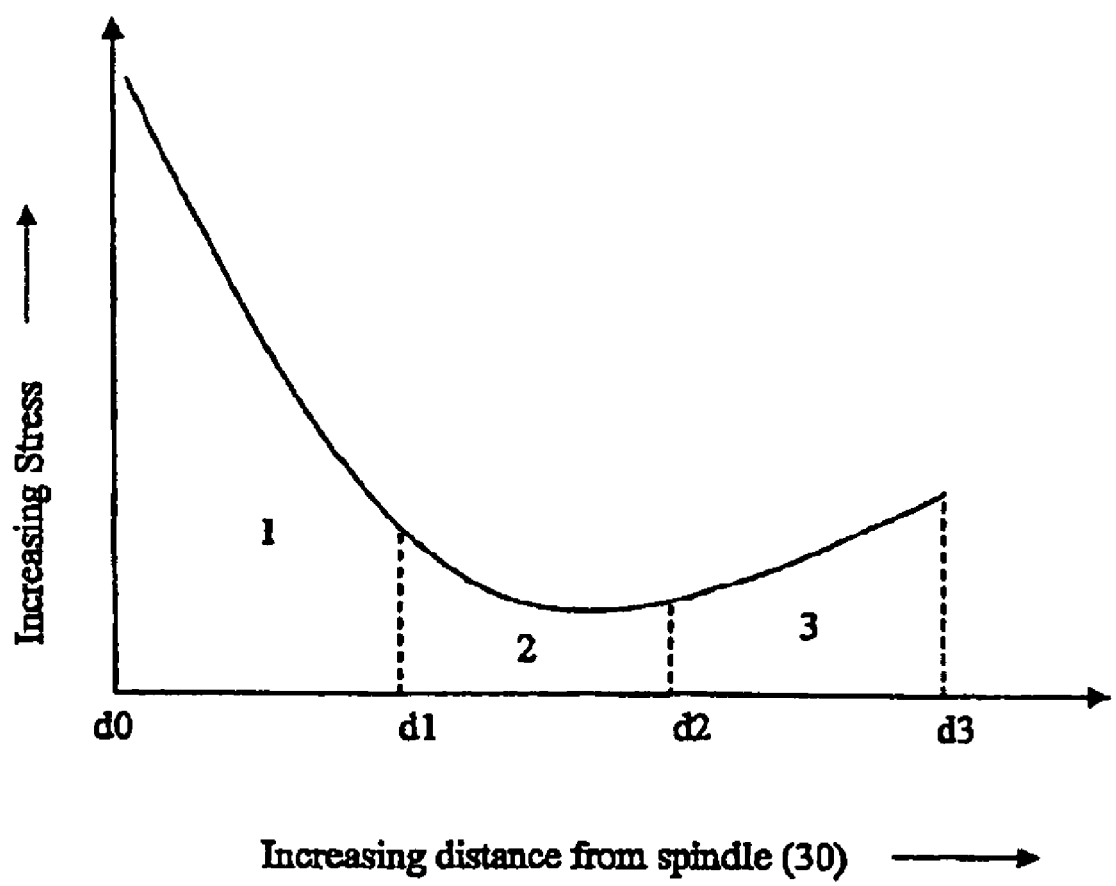
FIG. 10 is a graphical representation of the stress gradient that can result in performing the invention using the apparatus shown in FIG. 8.

The effect of developing a stress gradient in the liquid composition when applying the method of the invention can be more clearly described with reference to FIGS. 9 and 10. FIG. 9 represents an apparatus that may be used to prepare a porous polymer structure suitable for use as a vein or artery scaffold in tissue engineering applications. In this case, the containing vessel (10) will have an internal diameter that represents the desired diameter of an artery or vein. The vessel (10) should be thermally conductive so as to allow the liquid composition (20) contained therein to be heated or cooled as required. Spindle (30) is rotated in the liquid composition and applies stress to the liquid composition at least in the form of shear. Spindle (30) will have a diameter that represents the desired internal or void diameter of the artery or vein. The vertical length of the containing vessel (10), and hence spindle (30) may be selected as desired.

Upon rotation of the spindle (30) the liquid composition will experience high shear forces at the spindle surface (d0) which, depending on the applied shear rate, may dissipate at increasing distance away from the spindle (i.e. in the direction of d1 and d2). Through the flow interaction between the liquid composition and the wall of the containing vessel (10), the stress in the portion of the liquid closest to the wall may then increase (i.e. in the direction from d2 to d3). A stress gradient of this type is graphically represented in FIG. 9, which shows a reduction in stress experienced by the liquid composition as the distance from the spindle increases from d0 to d2. At distances approaching d3 the stress begins to increase due to the interaction of the liquid composition with the wall of the containing vessel (10).

Producing and manipulating a stress levels in the liquid composition can provide a particularly advantageous and effective way for controlling the morphology of the resulting porous polymer structure. For example, referring again to FIG. 10, the applied stress can be readily adjusted such that the level of stress experienced by the liquid composition at distances out to about d1 may be sufficient such that the liquid composition in that region (i.e. region 1) will undergo spinodal decomposition to provide a bi-continuous structure-formed composition which in turn can be "fixed" and subsequently afford the porous polymer structure having a bi-continuous morphology. For the region of the solution at a distance between about d1 and about d2 (i.e. region 2), the applied stress may be insufficient for the liquid composition to undergo spinodal decomposition at the given temperature and thus the distances d1 and d2 can be varied by simply adjusting the applied stress to thereby modify the morphology of the porous polymer structure.

Figure 11:
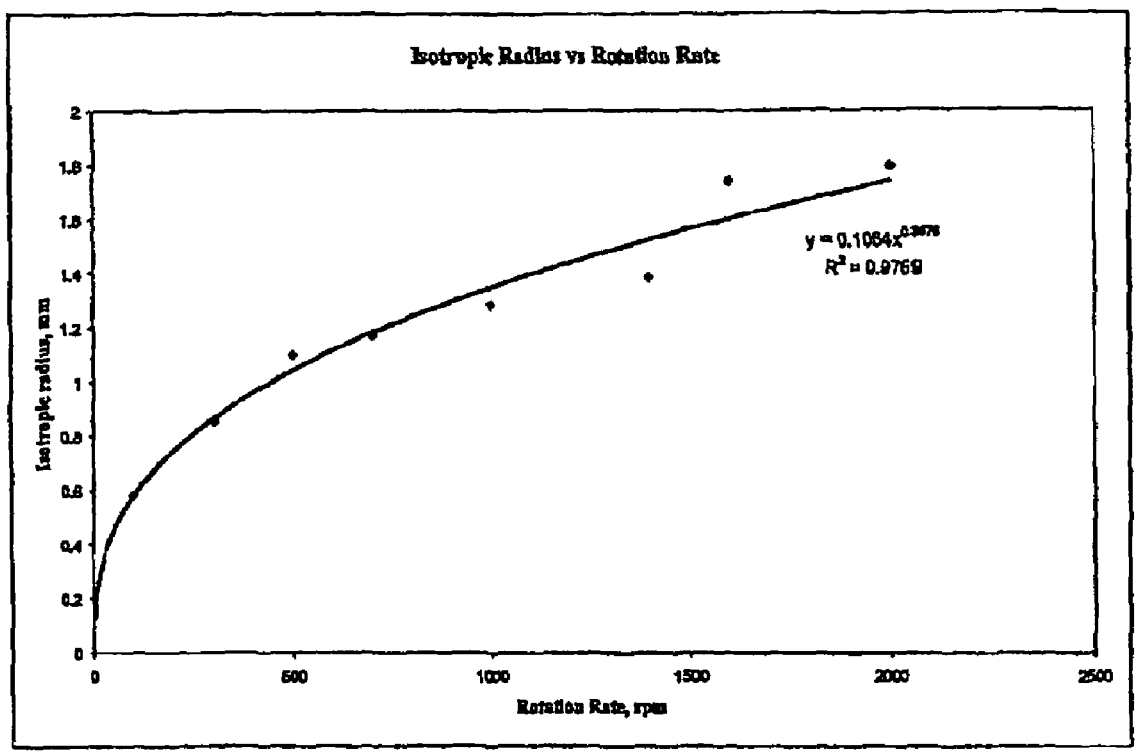
FIG. 11 is a graphical representation of the effect of shear on polymer morphology.

The data shown in FIG. 11 was derived by placing a 5% wt PLGA (50:50 PLA:PGA) in 80% wt dioxane into a cylindrical geometry, as shown in FIG. 9, and increasing the rate of rotation of the spindle (30). It can be clearly seen from FIG. 11 that as the rate of rotation (applied stress) increases so does the isotropic radius from 0.1-1.8 mm.

Figure 12:
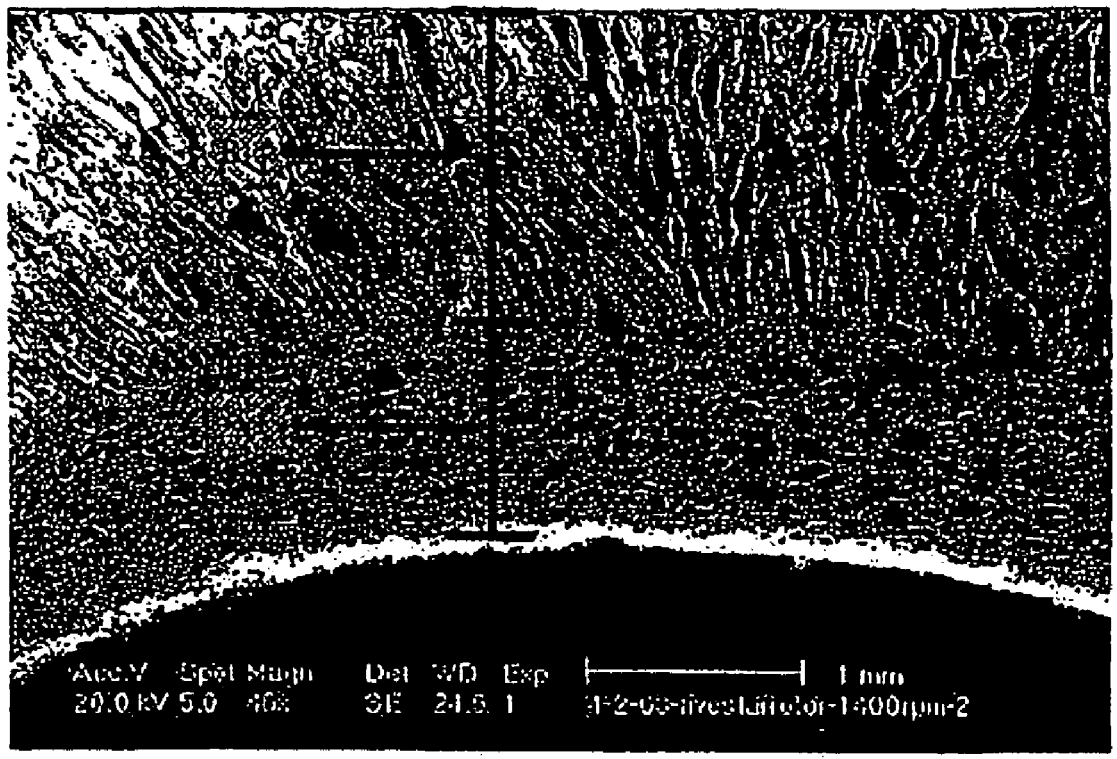
FIG. 12 shows a micrograph of a PLGA porous polymer prepared in accordance with the invention using a rotation rate of 1400 rpm.
Figure 13:
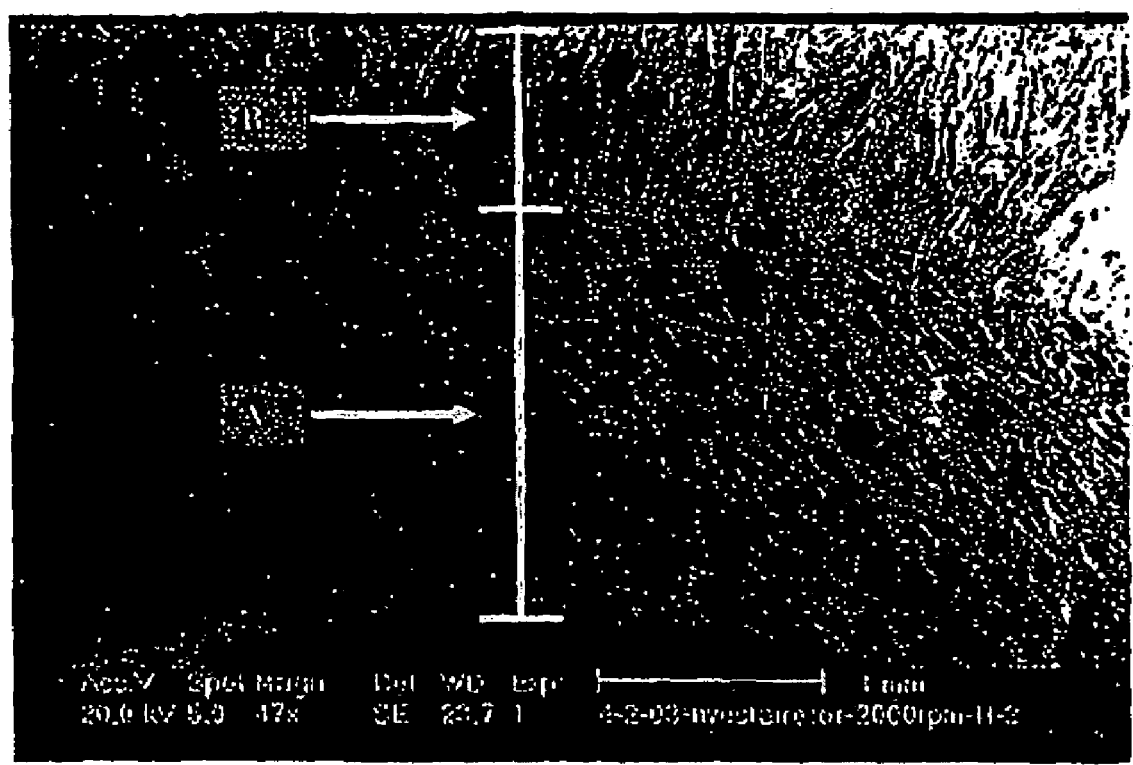
FIG. 13 shows a micrograph of a PLGA porous polymer prepared in accordance with the invention using a rotation rate of 2000 rpm.

FIGS. 12 and 13 both show a porous PLGA polymer formed by the method of the invention. The method of forming these porous polymers is described in more detail below in Example 1. It is believed that the morphology transition of the porous polymers between regions A and B is a result of phase transitions, such as liquid-liquid or liquid-solid phase transitions, prior to the solidification of the bi-continuous phase composition and subsequent removal of the polymer poor phase. It is also believed that the substantially uniform cellular interconnected pore structure of region A is due to the lack of a temperature gradient in this region. Whilst the aligned pores structure of region B is believed to be as a result of a temperature gradient across this region.

The porous polymer structures shown in FIG. 12 was formed using a rotational speed of 1400 rpm, whilst that shown in FIG. 13 was formed using an equivalent polymer solution at a rotational speed of 2000 rpm. It can be seen from FIGS. 12 and 13 that an increase in the rotational speed results in an increase in the width of cellular pore region A.

Figure 14:
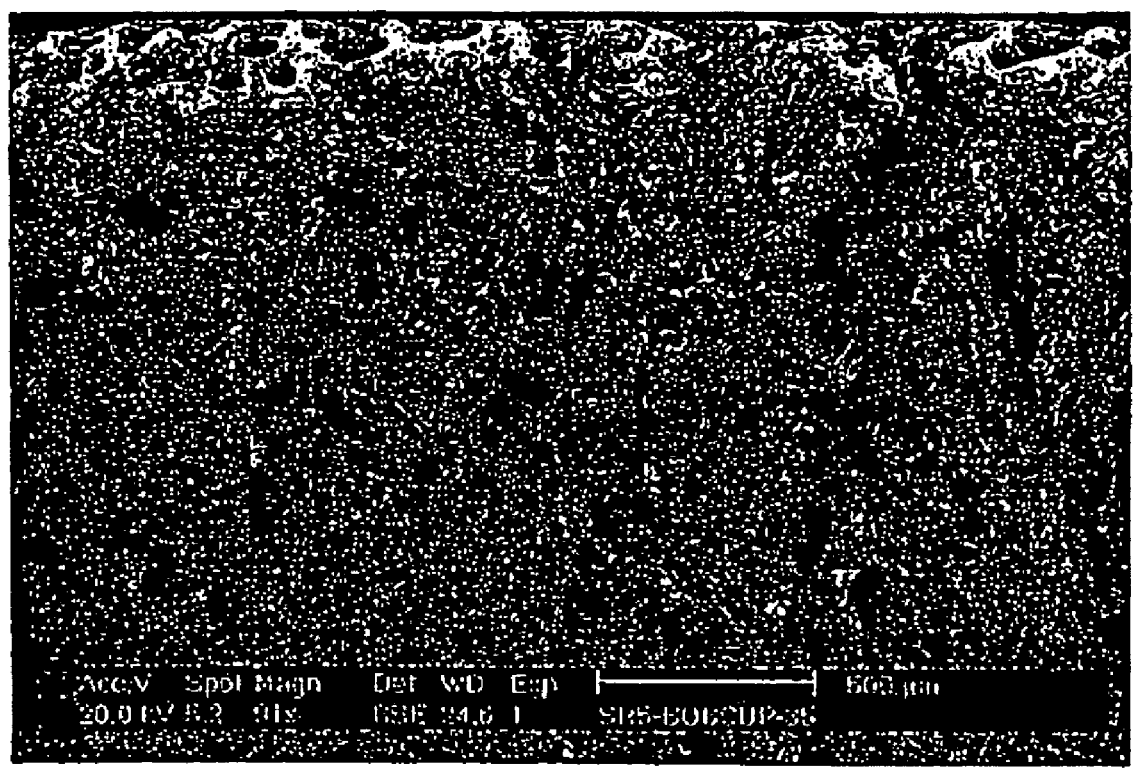
FIG. 14 shows a micrograph of a PLGA porous polymer prepared in a similar manner to that shown in FIGS. 12 and 13 but in the absence of applied stress.

FIG. 14 illustrates a polymer structure formed from a liquid composition similar to that used in preparing the structures shown in FIGS. 12 and 13, except that the spindle (30) was not rotated (i.e. no stress was applied). FIG. 14 clearly shows that the resulting polymer structure does not exhibit a cellular structure, with the pores being non-uniform and randomly distributed.

It will be appreciated that the bi-continuous morphology formed through the application of stress of the porous polymers in accordance with the invention may be present throughout the entire polymer structure or only a part(s) thereof.

Where the bi-continuous phase separated composition can be formed at a temperature which is above the glass transition temperature of the at least one polymer and the freezing temperature of the solvent (i.e. T2 and T3 in FIG. 2, respectively), the liquid composition will not be in a supercooled state and can therefore be advantageously aged or annealed without the solvent and/or polymer spontaneously solidifying. In this case, the liquid composition may be held at the appropriate temperature for an appropriate time to tailor the morphology of the bi-continuous structured-formed composition, and hence the resulting porous polymer morphology. It will be appreciated that if it is desirable to anneal the liquid composition this may be done whilst pressure is being applied but not during application of flow stress.

Where the bi-continuous phase separated composition is at a temperature below either the glass transition temperature of the at least one polymer or the freezing temperature of the at least one solvent (hereinafter referred to the solidification zone), the liquid composition will be in a supercooled state and therefore be prone to spontaneous solidification. Nevertheless, it will be appreciated from the foregoing that the temperature differential between the solidification zone and the liquid composition in this case can be less than that between the solidification zone and the liquid composition in the absence of stress. Accordingly, despite being in a supercooled state the driving force for spontaneous solidification of the liquid composition may be reduced, thereby providing a greater window of opportunity for annealing or aging the bi-continuous structure-formed composition.

In order to form the porous polymer having a bi-continuous morphology, it will be necessary to cause the at least one polymer in the bi-continuous phase separated composition to solidify. Where the temperature of the bi-continuous phase separated composition is above that of the solidification zone, the solidification of the at least one polymer may be initiated by reducing the temperature of the liquid composition to below the glass transition temperature of the at least one polymer and/or below the freezing temperature of the at least one solvent. Alternatively, it may be possible to subject the liquid composition to a pressure which induces solvent crystallisation and in turn cause the at least one polymer to solidify. Reducing the temperature of the liquid composition is, however, generally a preferred means for causing the at least one polymer in the bi-continuous phase separated composition to solidify.

Where the bi-continuous phase separated composition is at a temperature below the solidification zone, the liquid composition will be in a supercooled state and therefore will not generally require further impetus to cause the at least one polymer to solidify. In other words, the at least one polymer in the supercooled bi-continuous phase separated composition will generally automatically solidify. It will be appreciated that the rate of such solidification will generally be greater as the temperature differential between the supercooled liquid composition and the solidification zone increases.

Having "fixed" the bi-continuous morphology of the porous polymer, it will be necessary to remove the polymer poor phase from the composition to form the porous polymer. For example, the polymer poor phase (which will predominantly comprise solvent or solvent/non-solvent) may be removed by extracting it with a further suitable solvent that is a non-solvent for the polymer structure. The relative miscibility or solubility of the polymer poor phase in such a further solvent will, in part, determine the effectiveness in terms of the time required for extraction. Also, if appropriate, the extracting or leaching process can be carried out at an elevated temperature below the softening point of the porous polymer structure to reduce time requirements.

Removal of the polymer poor phase may also be achieved by other known techniques. Illustrative examples of other useful removal techniques include, but are not limited to, evaporation and sublimation.

The time required to effect the removal of the polymer poor phase will vary depending upon the technique employed, the type of solvent or non-solvent, the temperature used and the degree of extraction required. In some instances, it may be unnecessary to extract all of the polymer poor phase from the porous polymer structure. The amount of residual polymer, solvent or solvent/non-solvent from the polymer poor phase that can be tolerated will primarily depend upon the requirements of the intended end use application of the porous polymer.

Through manipulation of parameters such as the applied stress, dissolved polymer concentration, and annealing time of the bi-continuous phase separated composition, the invention advantageously enables the pore morphology of the porous polymer structure to be tailored. The porous polymer structures can be tailored to have pore sizes between 1-700 μm. The degree of alignment of the pores in the outer layer of the polymer structure can also be tailored along with the respective thickness of each of the porous polymer regions.

The porous polymer structures prepared in accordance with the method of the invention may also comprise additives such as dyes, pigments, stabilisers, bioactive substances such as biologically or pharmaceutically active compounds.

Such additives can be added to the porous polymer structure after it has been prepared, for example by coating techniques. The coating may be applied through absorption, adsorption and/or chemical bonding. Alternatively, the additives may be included in the liquid composition prior to the formation of the porous polymer structure. Generally it is preferred that the additives are incorporated in the porous polymer structure by this latter approach such that the additives are at least initially incorporated within the polymer matrix of the porous polymer structure (i.e. not simply located within the pores or on the surface of the pore structure). In this case, it may be desirable to select the solvent or solvent/non-solvent used in accordance with the invention to not only dissolve the one or more polymers but also the one or more additives.

The incorporation of additives in the porous polymer structure can be particularly advantageous when the structures are to be used in tissue engineering applications. For example, the structures may be provided with bioactive substances that function as receptors or chemoattractors for a desired population of cells.

In tissue engineering applications, it may be desired that the additive be incorporated for subsequent release in a controlled fashion. The additive may be released by bioerosion of the polymer phase, or by diffusion from the polymer phase. Alternatively, the additive may migrate to the polymer structure surface to become active.

Bioactive additives may be provided in a physiological acceptable carrier, excipient, stabiliser, etc, and may be provided in sustained release or timed release formulations. The additives may also incorporate agents to facilitate their delivery, such as antibodies, antibody fragments, growth factors, hormones or other targeting moieties, to which the additives are coupled.

Acceptable pharmaceutical carriers for therapeutic use are well known in the pharmaceutical field, and are described, for example, in *Remington's Pharmaceutical Science*, Mac Publishing Co., (A. R. Gennaro edt. 1985). Such materials are generally non-toxic to recipients at the dosages and concentrations employed, and include diluents, solubilizers, lubricants, suspending agents, encapsulating materials, solvents, thickeners, dispersants, buffers such as phosphate, citrate, acetate and other organic acid salts, anti-oxidants such as ascorbic acid, preservatives, low molecular weight (less than about 10 residues) peptides such as polyarginine, proteins such as serum albumin, gelatin or immunoglobulins, hydrophilic polymers such as poly(vinylpyrrolindinone), amino acids such as glycine, glutamic acid, aspartic acid or argninine, monosaccharides, disaccharides, and other carbohydrates including cellulose or its derivatives, glucose, mannose or dextrines, chelating agents such as EDTA, sugar alcohols such as mannitol or sorbitol, counter-ions such as sodium and/or non-ionic surfactants such as tween, pluronics or PEG.

The additive may be covalently attached to polymers having pendent free carboxylic acid groups. Detailed chemical procedures for the attachment of various moieties to polymer bound free carboxylic acid groups have been described in the literature. See, for example, U.S. Pat. Nos. 5,219,564 and 5,660,822; Nathan et al., *Bio. Cong. Chem.*, 4, 54-62 (1992) and Nathan, Macromolecules, 25, 4476 (1992). These publications disclose procedures by which polymers having pendent free carboxylic acid groups are reacted with moieties having reactive functional groups, or that are derivatized to contain active functional groups, to form a polymer conjugate.

Hydrolytically stable conjugates may be utilised when the additive is active in conjugated form. Hydrolysable conjugates may be utilised when the additive is inactive in conjugated form.

The amount of a given additive incorporated into the porous polymer structure will of course vary depending upon its nature and intended function. Those skilled in the art will readily appreciate such dosage requirements.

For porous polymer structures used in tissue engineering applications, a bioactive additive will generally be incorporated in order to provide optimal efficacy to the subject in need of treatment, typically a mammal. The dose and method of administration will vary from subject to subject and be dependent upon such factors as the type of mammal being treated, its sex, weight, diet, concurrent medication, overall clinical condition, the particular compounds employed, the specific use for which the compounds are employed and other factors which those skilled in the art will recognise. The porous polymer structures can be utilised in vivo as tissue engineering and tissue guided regeneration scaffolds in mammals such as primates, including humans, sheep, horses, cattle, pigs, dogs, cats, rats and mice, or in vitro. The polymer-drug combinations that may be prepared using the method of the invention can conveniently be prepared for storage under conditions suitable for the preservation of drug activity as well as maintaining the integrity of the polymer structure, and are typically suitable for storage at ambient or refrigerated temperatures.

Porous polymer structures prepared in accordance with the method of the invention that will be used in tissue engineering and tissue guided regeneration applications must typically also be sterilised. Sterilisation of the structures can readily be accomplished by conventional techniques such as irradiation or treatment with gasses or heat.

Example of biologically active compounds that may be used with the porous polymer structures include, but are not limited to, cell attachment mediators, such as the peptide containing variations of the "RGD" integrin binding sequence known to affect cellular attachment, biologically active ligands, and substances that enhance or exclude particular varieties of cellular or tissue ingrowth. Such substances include, for example, osteoinductive substances, such as bone morphogenic proteins (BMP), epidermal growth factor (EGF), fibroblast growth factor (FGF), platelet-derived growth factor (PDGF), insulin-like growth factor (IGF-I and II), TGF-β and the like.

Examples of pharmaceutically active compounds that may be used with the porous polymer structures include, but are not limited to, acyclovir, cephradine, malfalen, procaine, ephedrine, adriomycin, daunomycin, plumbagin, atropine, quanine, digoxin, quinidine, biologically active peptides, chlorin $e_6$, cephalothin, proline and proline analogues such as cis-hydroxy-L-proline, penicillin V, aspirin, ibuprofen, steroids, nicotinic acid, chemodeoxycholic acid, chlorambucil, and the like. Therapeutically effective dosages may be determined by either in vitro or in vivo methods. For each particular additive, individual determinations may be made to determine the optimal dosage required. The determination of effective dosage levels, that is, the dosage levels necessary to achieve the desired result, will be within the ambit of one skilled in the art. The release rate of the additives may also be varied within the routine skill in the art to determine an advantageous profile, depending on the therapeutic conditions to be treated.

A typical bioactive additive dosage might range from about 0.001 mg/kg to about 1000 mg/kg, preferably from about 0.01 mg/kg to about 100 mg/kg, and more preferably from about 0.10 mg/kg to about 20 mg/kg, relative to weight of the mammal. The additives may be used alone or in combination with other therapeutic or diagnostic agents Porous polymer structures in accordance with the invention may be conveniently prepared using conventional polymer processing techniques such as extrusion and injection moulding. Moulds used to form the porous polymer structure into a desired shape can be made from various materials such as glass, metal, ceramic and plastic.

Porous polymer structures in accordance with the invention may be used as separation or filtration materials, as absorbent materials and as scaffolds for catalysis, immobilisation of pharmaceutical compounds or biological molecules and tissue engineering.

The method of the invention can be incorporated into known methods of polymer manufacturing. For example, the modification of an injection moulding process to incorporate the method of the invention would allow the injection moulding system to be used at room temperature, thus alleviating the need to conduct the moulding under heated conditions.

The invention will hereinafter be described with reference to the following non-limiting examples.

EXAMPLES

Example 1

Solid-Liquid Separation

5% (w/v) 50/50 PLGA was dissolved in 1,4-dioxane. A similar apparatus to that shown in FIG. 9 was immersed into a water bath at a temperature 25° C. 5 ml of the PLGA-dioxane solution was pipetted into a glass vial within the apparatus of FIG. 9. The spindle (30) was rotated to induce shear into the solution (at 1400 or 2000 rpm). The temperature of the water bath was then reduced to −18° C. at 0.6° C. per minute. The resultant solidified bi-continuous polymer structure was placed into a freeze drying chamber under at a $10^{-3}$ mbar vacuum at 0° C. for 24 hours to remove any dioxane. The bi-continuous polymer was then washed with distilled water for 24 hours and vacuum dried.

The porous polymer structures shown in FIGS. 12 and 13 were formed by the method described above using rotational rates of 1400 and 2000 rpm, respectively.

It can be seen from FIGS. 12 and 13 that there is a region A of isotropic pores, (i.e. pores of even size and distribution), and a region B having directionally, or radially, aligned pores. A comparison of these regions in FIGS. 12 and 13 clearly shows that there is an increase in the cross-sectional thickness of region A, with an increase in the rotation or shear stress applied during formation of the structures.

Comparative Example 1

The method of example 1 was repeated without the application of rotational or shear stress. Although the liquid composition underwent a similar phase transition to that experienced by the composition in Example 1, the polymer structure formed with no stress applied (see FIG. 14) exhibits pores with no alignment or order.

Example 2

Liquid-Liquid Separation

A clear solution comprising 10% w/v of 85/15 (v/v) PLGA in dioxane and water was prepared and 5 mls placed in a similar apparatus to that shown in FIG. 9, located in a water bath set at −70° C. The spindle 30 was rotated at a speed of 1900 rpm to induce shear to the liquid composition. The solidified bi-continuous phase polymer was freeze dried under vacuum at a $10^{-3}$ mbar vacuum at −8° C. for 24 hours to remove any dioxane. The bi-continuous polymer was then washed with distilled water for 24 hours and vacuum dried.

The resulting porous polymer formed had a region of substantially uniform cellular interconnected pores and a region of directional pores similar to the structures shown in FIGS. 12 and 13.

A scanning electron microscope (SEM) (JEOL 6400LA, USA) was used to determine the morphology of the porous polymer structures. Cross sections of the structures were coated with titanium using a sputter coater (Eiko IB5 Ion Coater, Japan) under an argon atmosphere using a sputter current of 60 mA. Samples were observed under the SEM at an accelerating voltage of 5 kV and pressure of 1 Pa.

Figure 15:
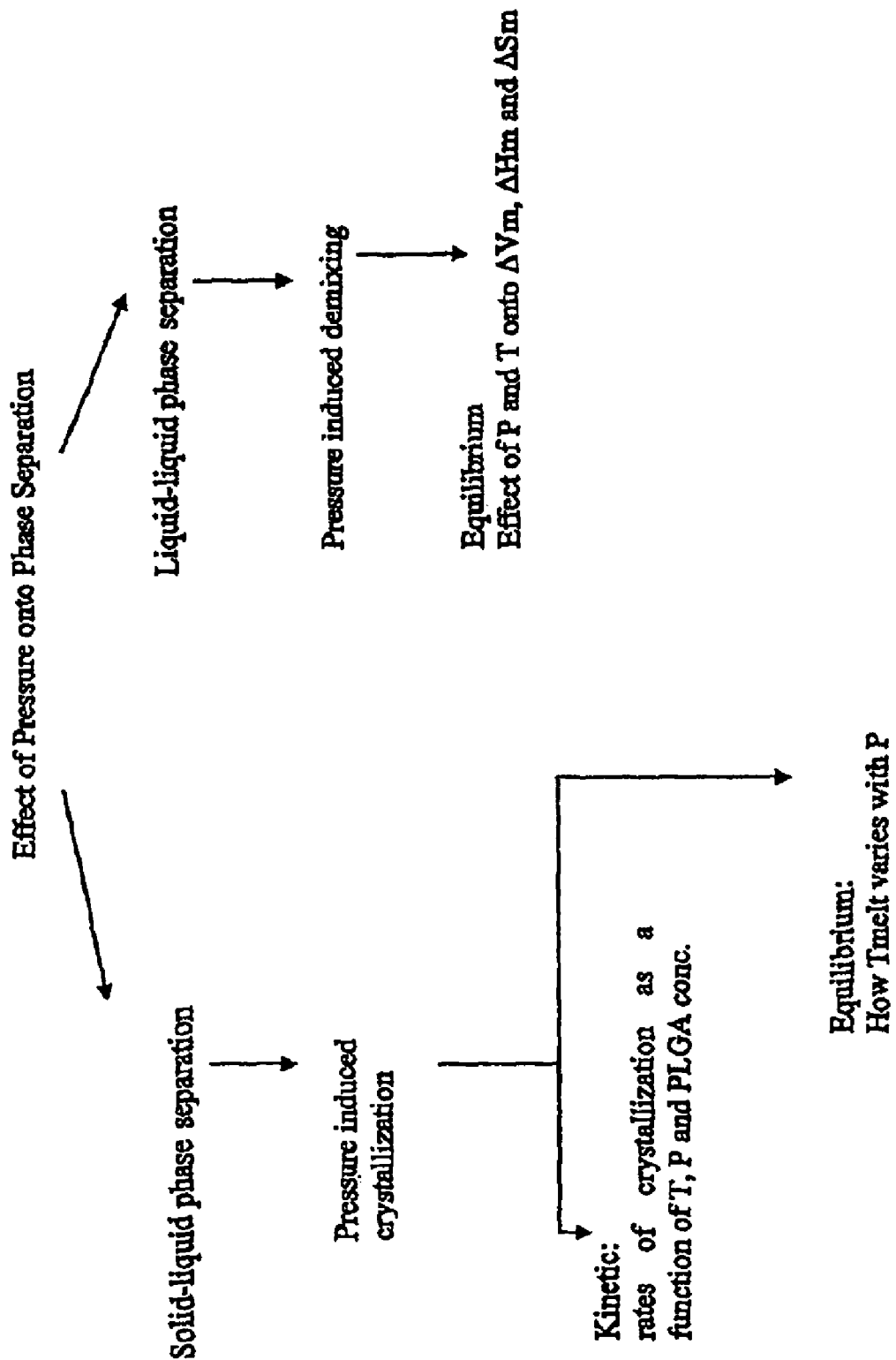
FIG. 15 is a schematic diagram of the conceptual flow of Examples 3 and 4.

Examples 3 and 4 below demonstrate how stress in the form of pressure affects the formation of the porous polymer of the present invention. In particular the examples evaluate the effect of pressure on bi-continuous phase separation. FIG. 15, illustrates that concept relating to Example 3 (solid-liquid phase separation) and Example 4 (liquid-liquid phase separation).

Example 3

Solid-Liquid Phase Separation (Kinetic Data)

In this Example, a number of PLGA dioxane solutions (0%, 2%, 5%, 8% and 10%) were prepared. Each solution was then loaded into the high pressure density meter.

The solution in the density meter was then cooled to 15° C. using an external water bath and the solutions left for the temperature of the solutions to equilibrate for 30 min. The solution in the high pressure density meter was then pressurized to respective set point pressures (from 350 bar-500 bar).

The changes in density of the solution were then recorded every 30 seconds for 30 min (or until the density reached a plateau reading). The solidified solution was then heated up at a rate of 0.5° C./min at the pressurizing pressure to record the melting temperature of the solution. The density, temperature and pressure measurements were taken every 2 min until all the solution melted for the purpose of the Example the melting temperature was taken as the temperature when the density first started to decrease drastically.

Figure 16:
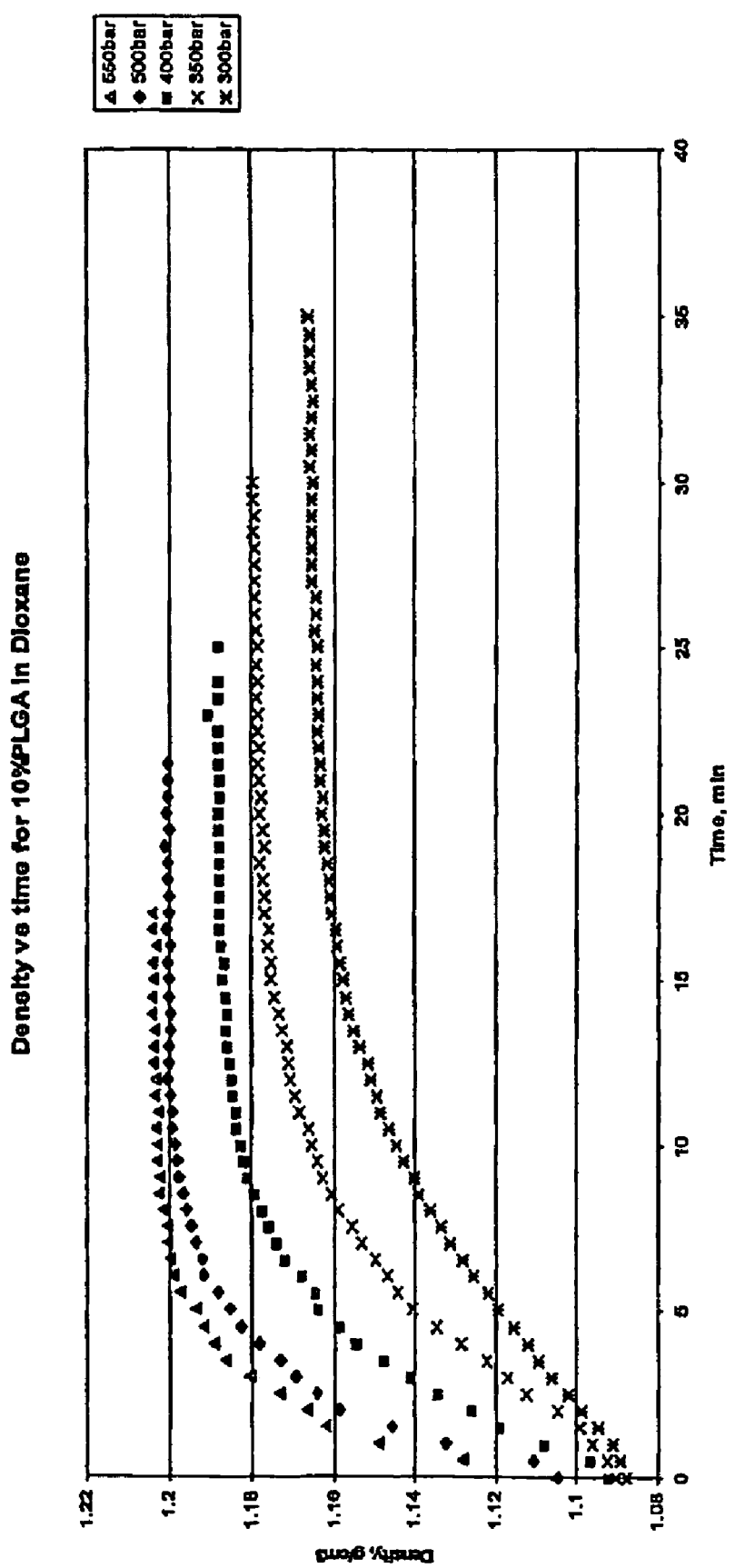
FIG. 16 is a graph of density versus time for 10% PLGA in dioxane for varying pressures.
Figure 17:
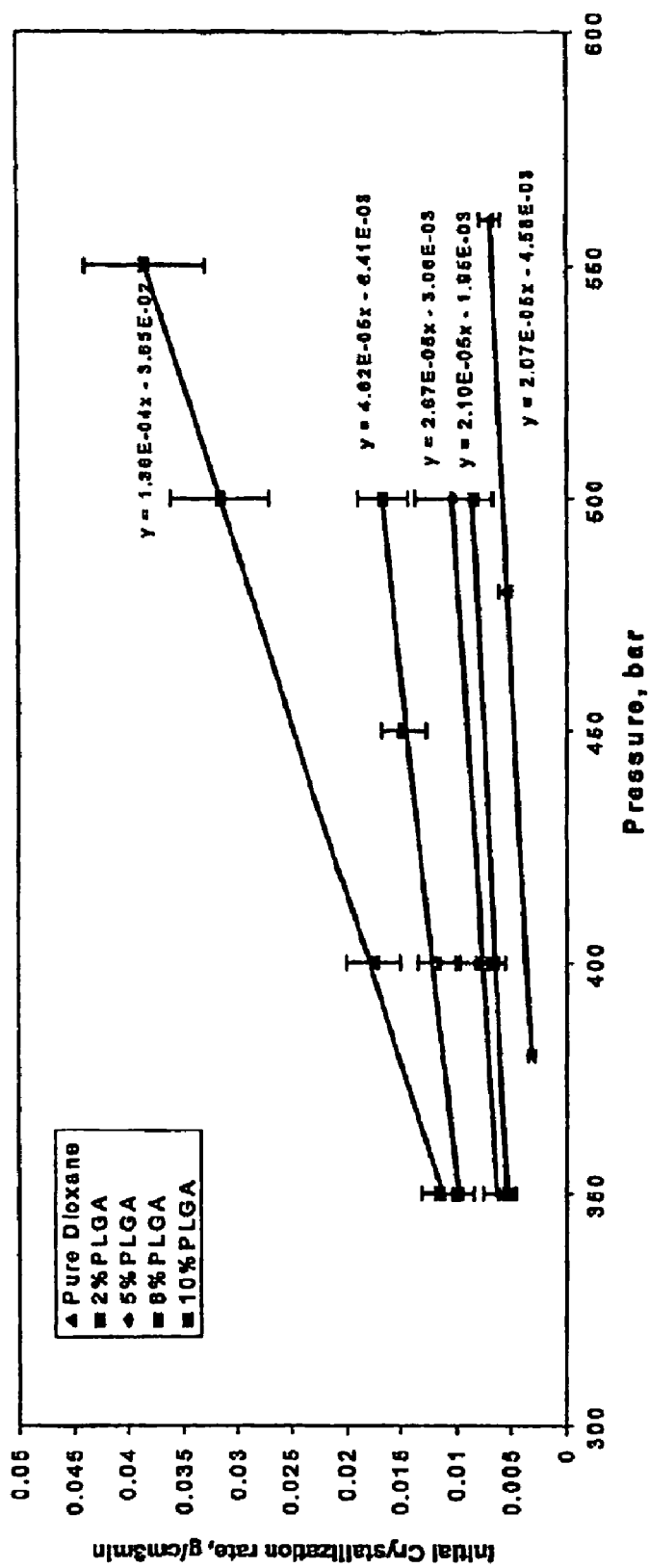
FIG. 17 is a graph of the initial crystallisation rate versus pressure of solutions with varying PLGA concentrations.
Figure 18:
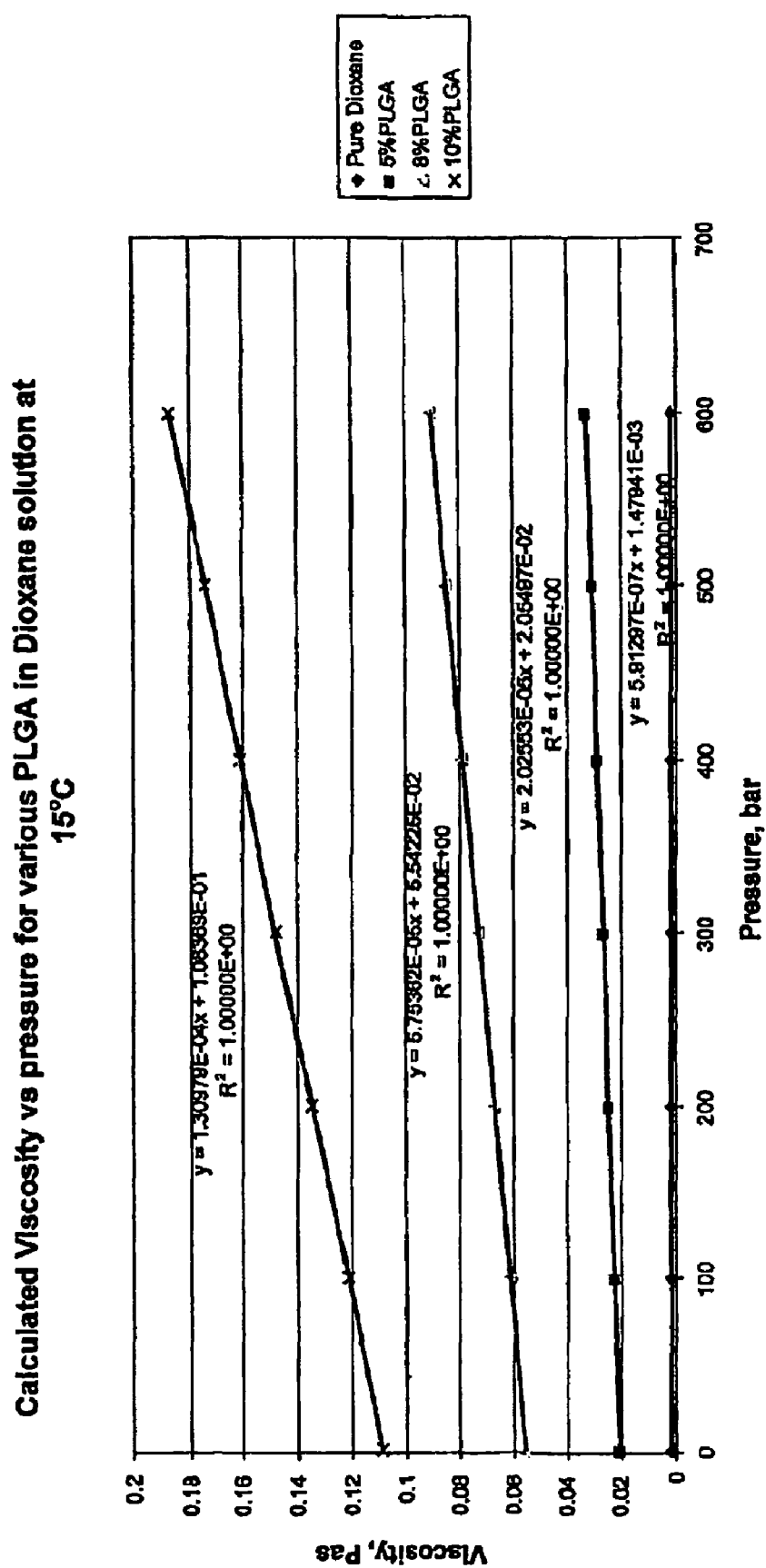
FIG. 18 is a graph of viscosity versus pressure of solutions with varying PLGA concentrations.

The results from these tests were then plotted as a function of time and pressure the initial rate of density change, i.e. the slope of the density curve is taken as the initial rate of crystallization. As illustrated in FIGS. 16 and 17. When the curve (FIG. 16) reaches a plateau the porous polymer structure is kinetically fixed. As shown in FIG. 17, the crystallization rate increase as pressure increases due to more supersaturation. Viscosity fluctuations (regions of increased viscosity) with the solution become magnified with increased pressure which leads to faster crystallisation.

The viscosity dependence on pressure can be presented by $$\left(\frac{\partial \eta}{\partial p}\right)_T = -\frac{\kappa_T(p,T)}{\alpha_T(p,T)}\left(\frac{\partial \eta}{\partial T}\right)_p$$

Figure 19:
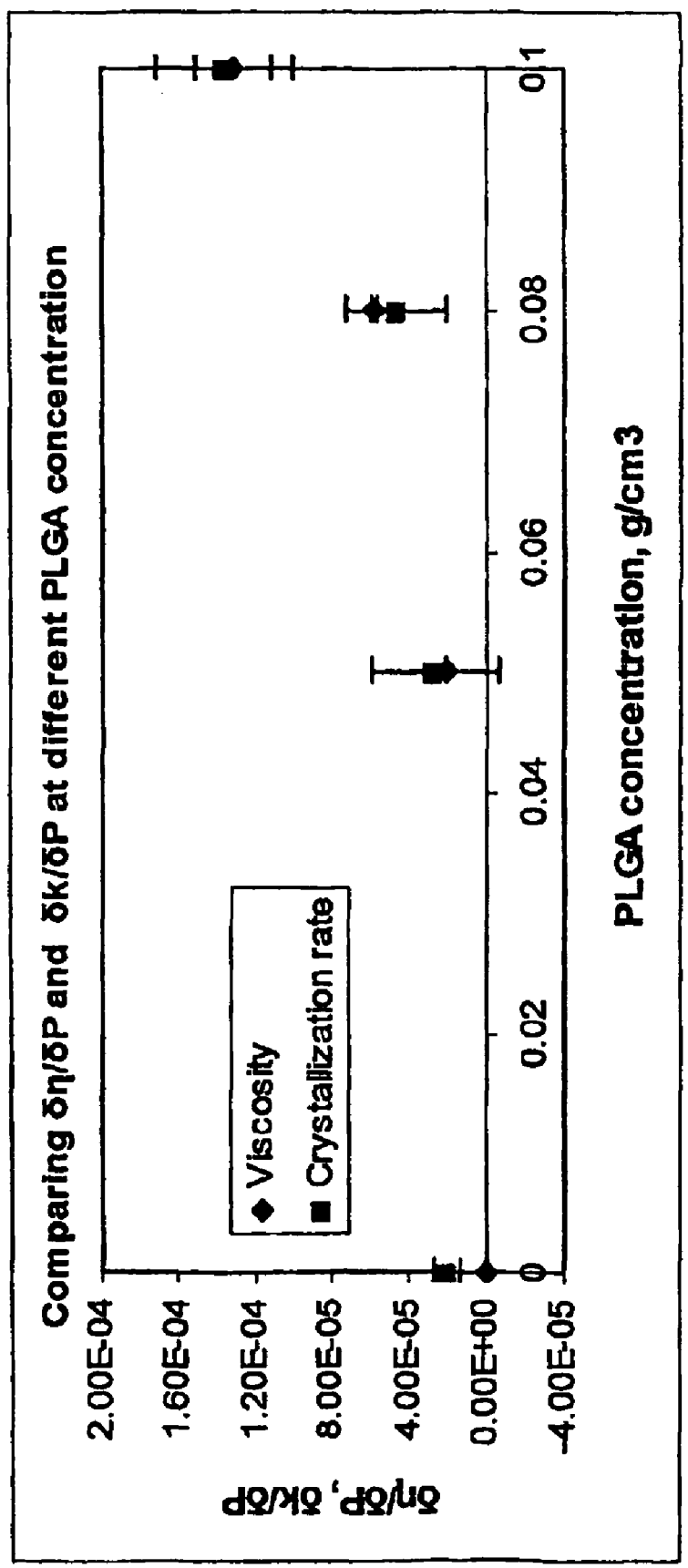
FIG. 19 is a graph of the change in viscosity/change in pressure and change in initial crystallisation rate/change in pressure versus PLGA concentrations.
Figure 20:
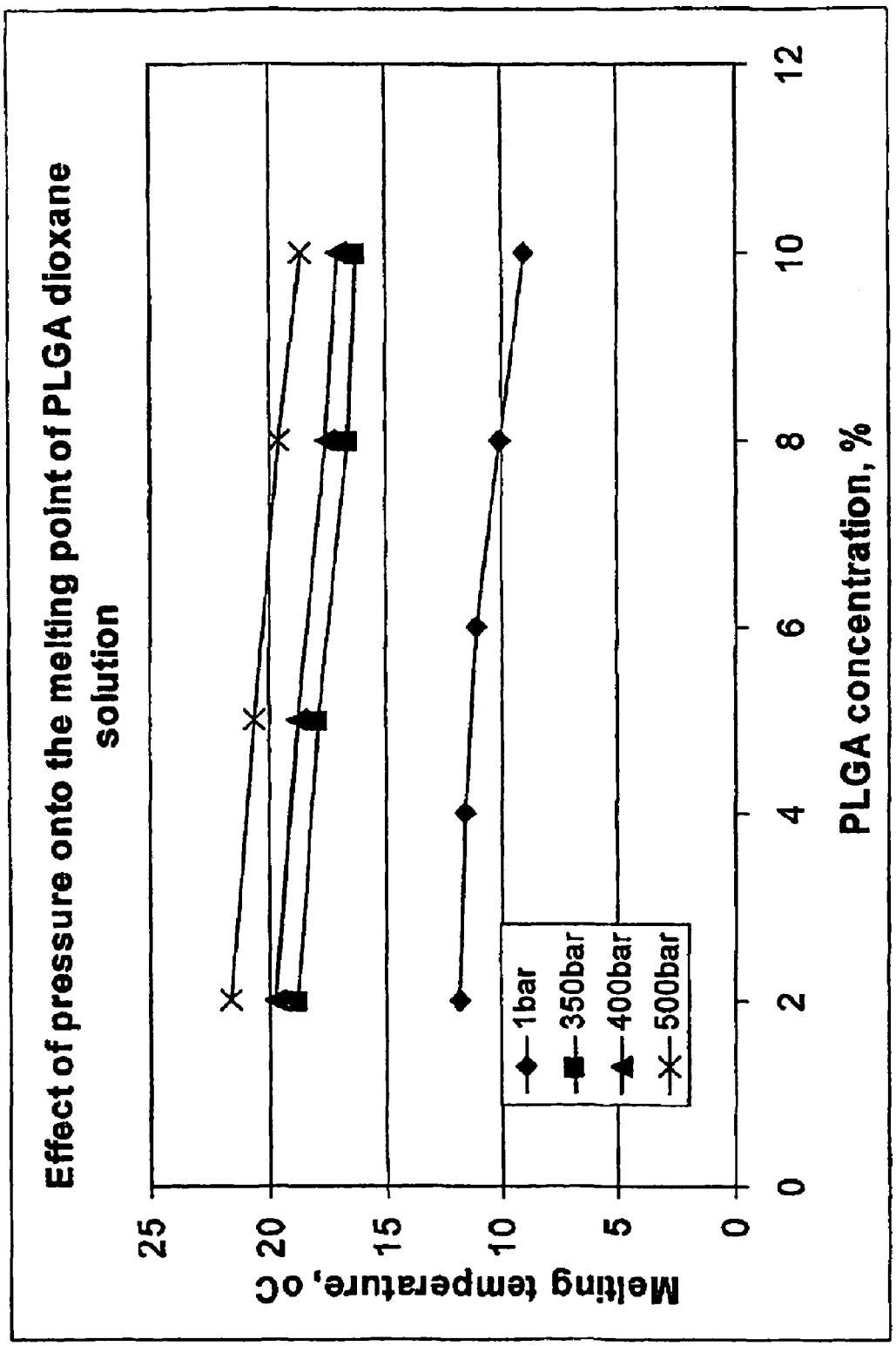
FIG. 20 is a graph of melting temperature versus PLGA concentrations at varying pressures.

Where
$\kappa_T$ is the isothermal compressibility and
$\alpha_T$ is the isobaric thermal expansion coefficient When the change viscosity and initial crystallisation rate are compared as in FIG. 19, it can be seen that changes in viscosity with pressure correlate well with the changes of initial crystallization rate change with pressure for different PLGA concentrations. FIG. 20 shows that as pressure increases so does the melting temperature. Therefore by selecting the appropriate pressure phase separation can be induced into the room temperature or ambient range.

The isothermal compressibility, isobar thermal expansion pressure, temperature, and viscosity may be all measured by the above equation.

Example 4

Liquid-Liquid Phase Separation (Equilibrium Data)

In this Example PLGA-Dioxane-water solutions (0%, 2%, 5% and 8%) at various volumetric ratios (88/12, 87/13, 86/14, 85/15, 80/20) were prepared. Each Solution was loaded into the high pressure density meter. The setup of the equipment is shown in FIG. 1.

The solution in the density meter was then heated up to 70° C. using an external water bath and the solutions left for the temperature of the solution to equilibrate for 30-60 min (until the temperature became constant).

The solution in the high pressure density meter was then pressurized to 500 bar at intervals of 100 bar. After being pressurized to the appropriate pressure, the solution was allowed to sit at this pressure for a period of 10 min to equilibrate. Temperature, density and pressure measurements were recorded for another 10 min (with 2 min intervals). Data was taken during pressurizing and depressurizing cycles and were compared to check for dissimilarity.

The above steps were repeated for five (5) other temperatures above the ambient cloud point temperature.

Figure 21:
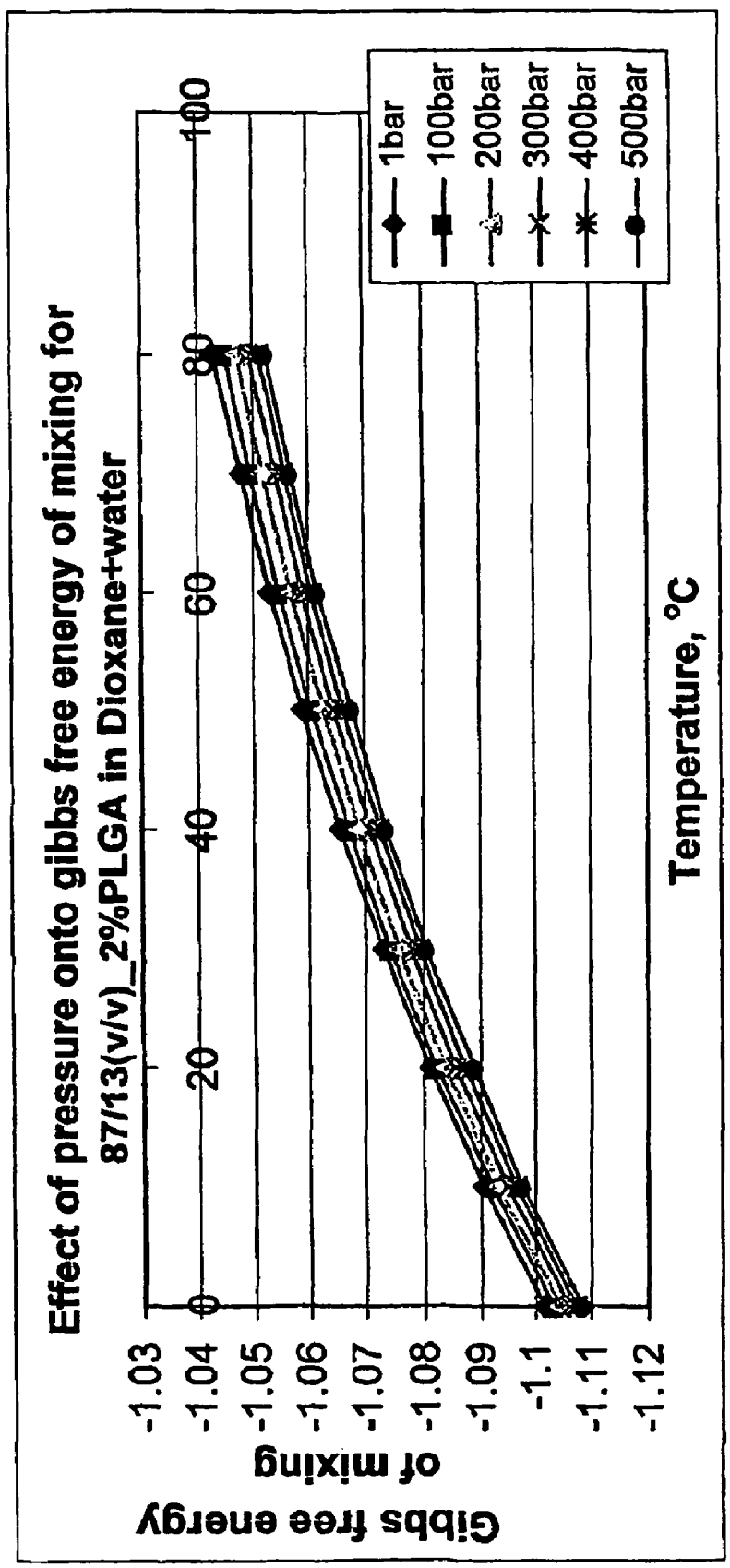
FIG. 21 is a graph of Gibbs free energy of mixing versus temperature for a 2% PLGA solution at varying pressures.
Figure 22:
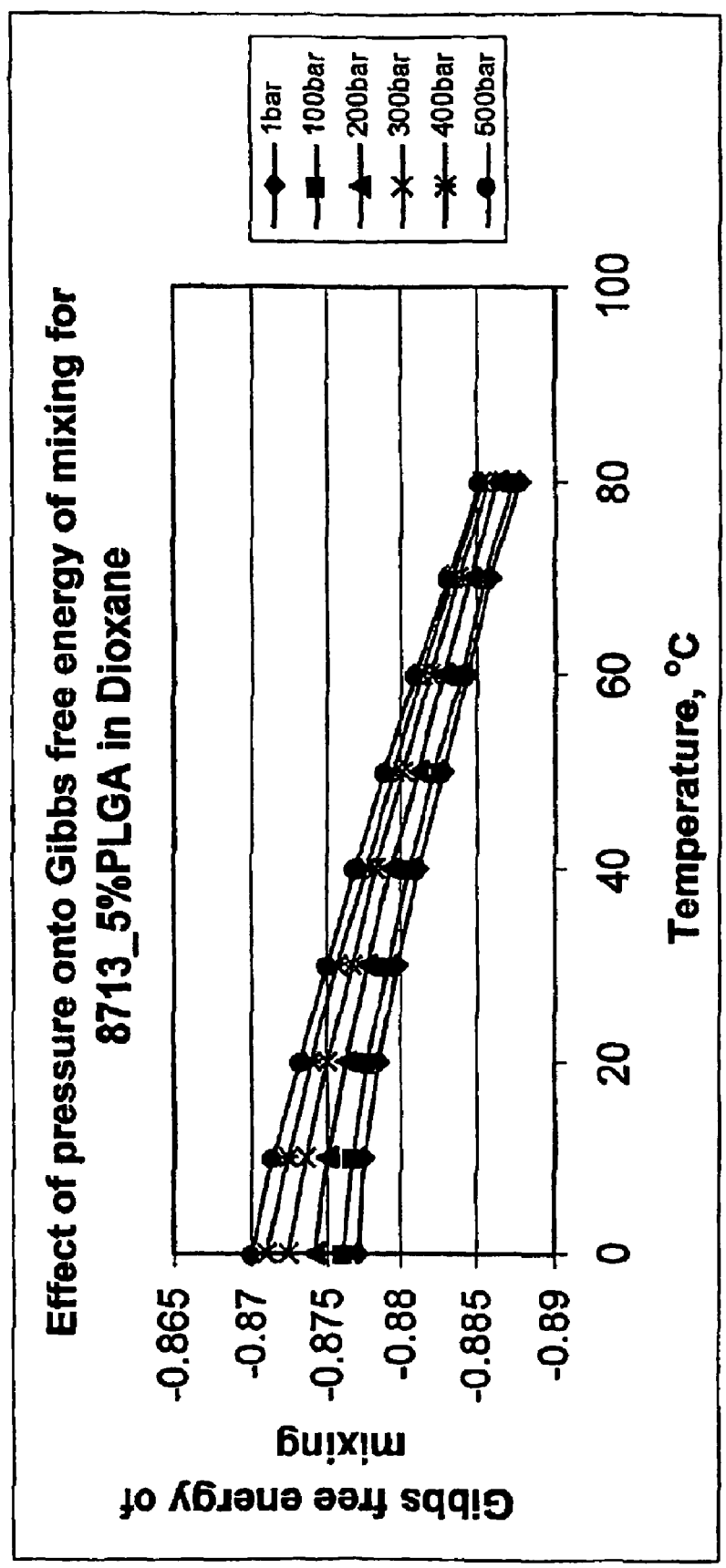
FIG. 22 is a graph of Gibbs free energy of mixing versus temperature for a 5% PLGA solution at varying pressures.
Figure 23:
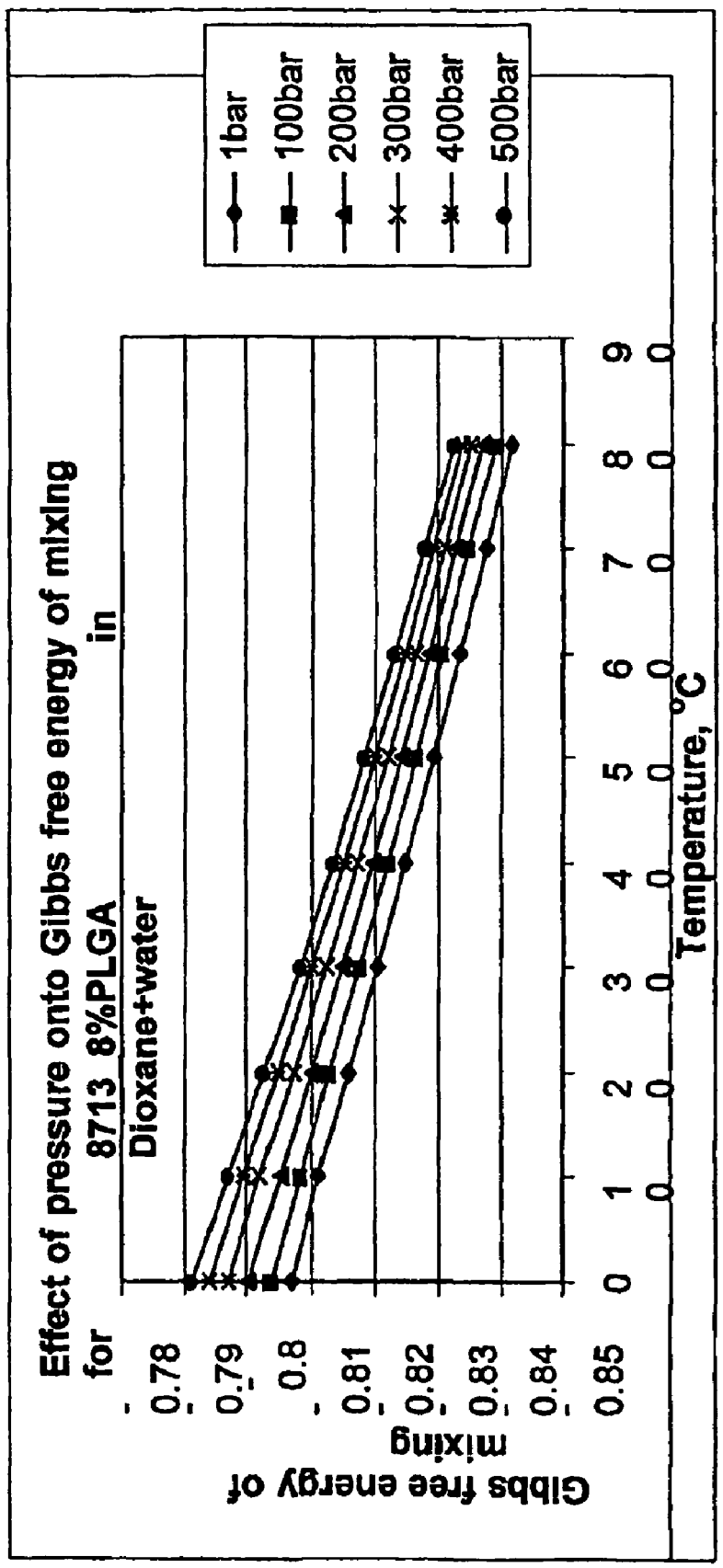
FIG. 23 is a Gibbs free energy of mixing versus temperature for an 8% PLGA solution for varying pressures.

FIG. 21 illustrate that a decrease in the Gibbs free energy means that the solution mixes better and therefore will be more stable. However the Gibbs free energy is affected by the polymer concentration (see FIGS. 22 and 23), where the increase in PLGA results in an increase in Gibbs free energy. An increase in Gibbs free energy creates instability and therefore phase separation of the system.

Figure 24:
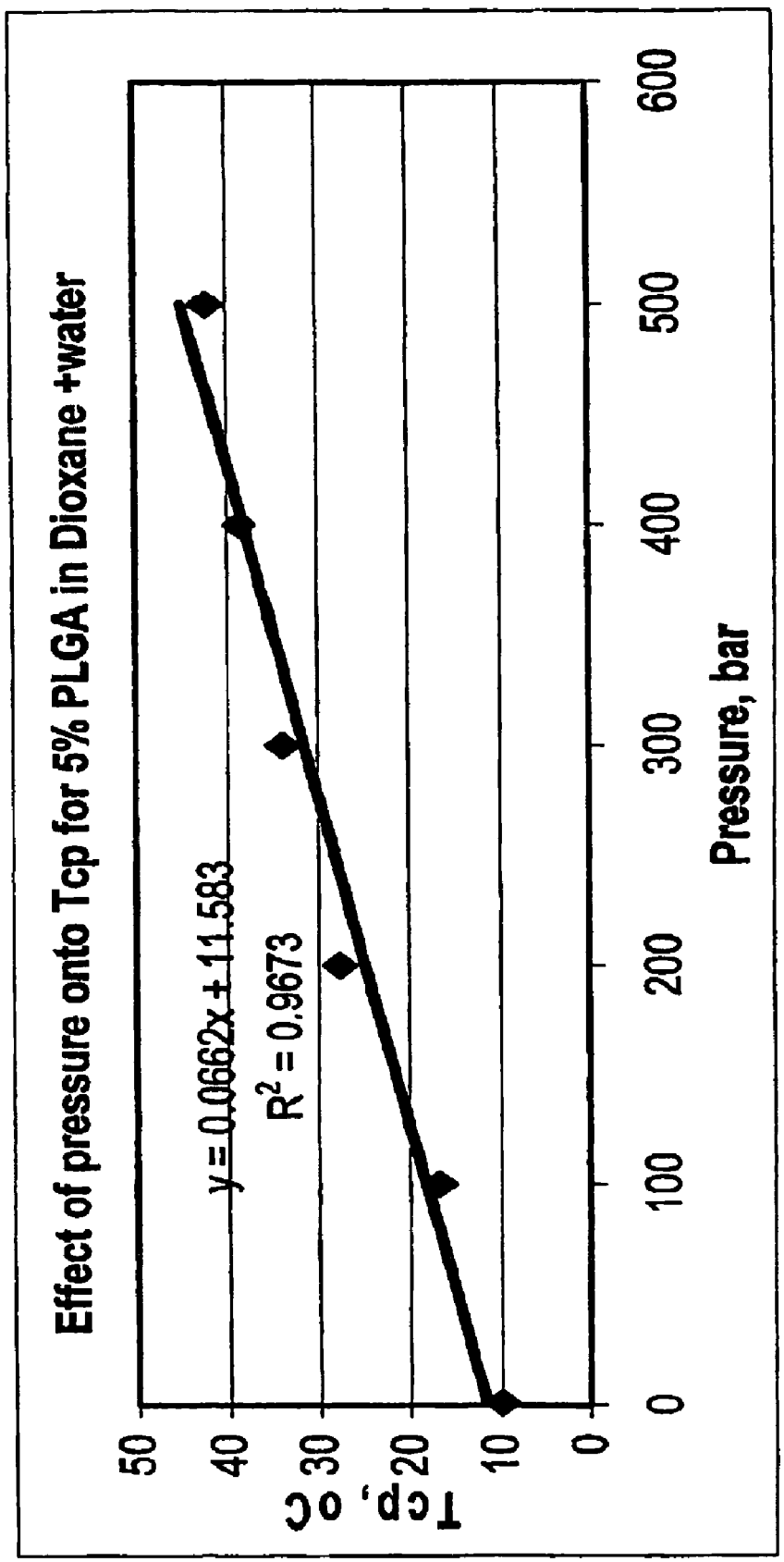
FIG. 24 is a graph of the cloud point temperature versus pressure in respect to the solution of FIG. 22.
Figure 25:
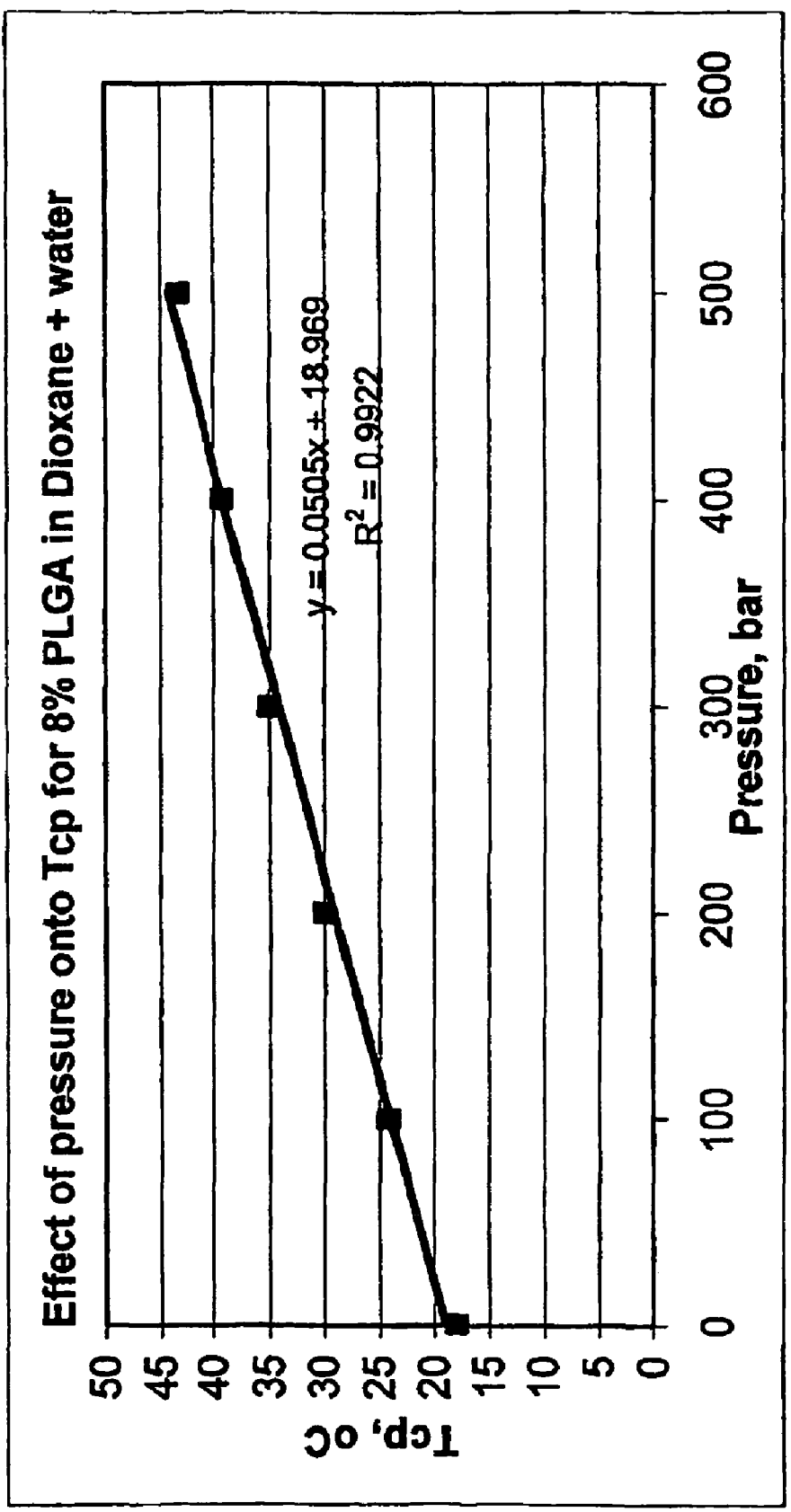
FIG. 25 is a graph of the cloud point temperature versus pressure for the solution of FIG. 23.

By taking data points for various pressure settings at a particular Gibbs free energy and plotting temperature versus pressure it can be seen that the cloud point temperature (Tcp) has a substantially linear relationship with applied pressure. FIGS. 24 and 25 show the effect of applied pressure on Tcp for 5% and 8% PLGA solution respectively.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of preparing a porous polymer structure comprising the steps of:
   forming a liquid composition comprising at least one polymer dissolved in at least one solvent;
   subjecting the liquid composition to stress, to cause the liquid composition to form a bi-continuous phase separated composition, the bi-continuous phase separated composition comprising a polymer rich phase and a polymer poor phase;
   solidifying the at least one polymer in the polymer rich phase; and
   removing the polymer poor phase from the polymer rich phase to provide the porous polymer structure having a bi-continuous morphology from the polymer rich phase.

2. The method of claim 1 wherein the liquid composition is prepared by heating the at least one polymer and at least one solvent to a temperature required to dissolve an amount of at least one polymer in the solvent.

3. The method of claim 2 wherein all of the at least one polymer is dissolved in the at least one solvent to form a homogeneous solution.

4. The method of claim 2 wherein the amount of polymer dissolved in the liquid composition is about 0.5 to about 50 wt % based on the total weight of the liquid composition.

5. The method of claim 1 wherein the liquid composition further comprises additives selected from the list of dyes, pigments, stabilizers and bioactive substances.

6. The method of claim 5 further comprising the step of adding the additives to the liquid composition prior to forming the bi-continuous phase separated composition.

7. The method of claim 1, further include a step of subjecting the liquid composition to a reduction in temperature; wherein the temperature is reduced during the step of subjecting the liquid composition to stress.

8. The method of claim 1 wherein the stress is at least one form selected from the group of shear stress, compressive stress and extensional stress.

9. The method of claim 1 wherein the bi-continuous morphology of the porous polymer structure is a plurality of interconnected pores having a cellular structure.

10. The method of claim 1 wherein the bi-continuous phase separated composition comprises greater than 50% of the polymer rich phase.

11. The method of claim 1 wherein the bi-continuous phase separated composition comprises greater than 60% of the polymer rich phase.

12. The method of claim 1 wherein the bi-continuous phase separated composition comprises greater than 80% of the polymer rich phase.

13. The method of claim 1 wherein the liquid composition further comprises a non-solvent, the non-solvent being miscible with the at least one solvent.

14. A method of preparing a porous polymer structure comprising the steps of:
   forming a liquid composition comprising at least one polymer dissolved in at least one solvent;
   subjecting the liquid composition to stress to decrease the Gibbs free energy of mixing of the composition and form a homogeneous solution;
   simultaneously or consecutively decreasing the temperature of the liquid composition to form a bi-continuous phase separated composition, the bi-continuous phase separated composition comprising a polymer rich phase and a polymer poor phase;
   solidifying the at least one polymer in the polymer rich phase; and
   removing the polymer poor phase from the polymer rich phase to provide the porous polymer structure having a bi-continuous morphology from the polymer rich phase.

15. The method of claim 14 wherein different levels of stress are applied to different regions of the liquid composition to cause differing morphologies to form in the bi-continuous phase separated composition.

16. The method of claim 15 wherein a continuous level of stress variation is applied across the liquid composition.

17. The method of claim 15 wherein a discreet level of stress variation is applied across the liquid composition.

18. The method of claim 15 wherein a temperature gradient is applied across the liquid composition while the liquid composition is subjected to stress.

19. The method of claim 14 wherein the bi-continuous phase separated composition is formed at a temperature above the glass transition temperature of at least one polymer and the freezing temperature of the solvent.

20. The method of claim 19 wherein the liquid composition is held at said temperature for a pre-determined time.

21. The method of claim 14 wherein a stress gradient is established in the liquid composition to cause different morphologies to form across the stress gradient.

22. The method of claim 14 wherein the bi-continuous phase separated composition is held at a temperature below either the glass transition temperature of the at least one polymer or the freezing temperature of the at least one solvent.

23. The method of claim 14 wherein the solidification of the bi-continuous phase separated composition includes the step of reducing the temperature of the liquid composition to a temperature below the glass transition temperature of the at least one polymer and/or below the freezing temperature of the at least one solvent.

24. The method of claim 14 wherein the solidification of the bi-continuous phase separated composition includes the step of subjecting the liquid composition to sufficient pressure to induce solvent crystallisation and/or causing the at least one polymer to solidify.

25. The method of claim 14 wherein the step of removing the polymer poor phase includes the steps of:
   adding a further solvent, the further solvent being miscible or soluble with the at least one solvent and a non-solvent of the polymer structure; and
   extracting or leaching the further solvent from the polymer rich phase.

26. A method of preparing a porous polymer structure comprising the steps of:
   forming a liquid composition comprising at least one polymer dissolved in at least one solvent, the liquid composition being a homogeneous solution at a predetermined temperature;
   subjecting the liquid composition to stress at the predetermined temperature to increase the Gibbs-free energy of mixing of the composition causing the liquid composition to form a bi-continuous phase separated composition at the predetermined temperature, the bi-continuous phase separated composition comprising a polymer rich phase and a polymer poor phase;
   solidifying the at least one polymer in the polymer rich phase; and
   removing the polymer poor phase from the polymer rich phase to provide the porous polymer structure having a bi-continuous morphology from the polymer rich phase.

27. A porous polymer structure produced by the method of claim 26, wherein at least a portion of the polymer has a bi-continuous morphology comprising a plurality of interconnected pores having a cellular structure.

28. The method of claim 26 wherein the bi-continuous phase separated composition is held at a temperature below either the glass transition temperature of the at least one polymer or the freezing temperature of the at least one solvent.

29. The method of claim 26 wherein the solidification of the bi-continuous phase separated composition includes the step of reducing the temperature of the liquid composition to a temperature below the glass transition temperature of the at least one polymer and/or below the freezing temperature of the at least one solvent.

30. The method of claim 26, wherein the solidification of the bi-continuous phase separated composition includes the step of subjecting the liquid composition to a pressure to induce solvent crystallisation and/or causing the at least one polymer to solidify.

31. A porous polymer structure wherein at least a portion of the polymer has a bi-continuous morphology comprising a plurality of interconnected pores having a cellular structures;
   wherein the polymer has regions of different morphology.

32. The porous polymer structure of claim 31 wherein the plurality of interconnected pores forms an interconnected pore network.

33. The porous polymer structure of claim 32 wherein the structure forms at least part of a tissue scaffold in tissue engineering or tissue guided regeneration applications.

34. The porous polymer structure of claim 31 wherein the polymer incorporates an additive into the walls of the cellular structure.

35. The porous polymer structure of claim 34 wherein the additive is selected from the group consisting of dyes, pigments, stabilizers and bioactive substances.

36. The porous polymer structure of claim 34 wherein the structure forms at least part of a tissue scaffold in tissue engineering or tissue guided regeneration applications.

37. The porous polymer structure of claim 31 wherein the polymer has a uniform cellular structure.

38. A porous polymer structure produced by the method of any one of claim 1, 14 or 26, wherein at least a portion of the polymer has a bi-continuous morphology comprising a plurality of interconnected pores having a cellular structure.

* * * * *